US008874079B2

(12) United States Patent
Zhou et al.

(10) Patent No.: US 8,874,079 B2
(45) Date of Patent: Oct. 28, 2014

(54) CONTROL METHOD FOR HOME BASE STATION ACCESS AND HOME BASE STATION GATEWAY

(75) Inventors: Xiaoyun Zhou, Shenzhen (CN); Zaifeng Zong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 59 days.

(21) Appl. No.: 13/808,821

(22) PCT Filed: Jun. 23, 2011

(86) PCT No.: PCT/CN2011/076185
§ 371 (c)(1),
(2), (4) Date: Jan. 7, 2013

(87) PCT Pub. No.: WO2012/003765
PCT Pub. Date: Jan. 12, 2012

(65) Prior Publication Data
US 2013/0115914 A1    May 9, 2013

(30) Foreign Application Priority Data

Jul. 9, 2010    (CN) .......................... 2010 1 0225457

(51) Int. Cl.
| H04M 1/66 | (2006.01) |
| H04W 12/08 | (2009.01) |
| H04W 48/18 | (2009.01) |
| H04W 28/16 | (2009.01) |
| H04W 84/04 | (2009.01) |
| H04W 88/16 | (2009.01) |

(52) U.S. Cl.
CPC .............. H04W 12/08 (2013.01); H04W 48/18 (2013.01); H04W 28/16 (2013.01); H04W 84/045 (2013.01); H04W 88/16 (2013.01)
USPC ......................................... 455/410; 455/444

(58) Field of Classification Search
CPC ..... H04W 12/06; H04W 12/08; H04W 28/16; H04W 28/24
USPC .......... 370/328, 338; 455/405, 406, 410, 411, 455/426.2, 432.1, 443, 444
See application file for complete search history.

(56) References Cited

U.S. PATENT DOCUMENTS

| 2008/0076425 A1* | 3/2008 | Khetawat et al. ............. 455/436 |
| 2010/0074187 A1* | 3/2010 | Sun et al. ...................... 370/329 |
| 2011/0170517 A1* | 7/2011 | Bakker et al. ................. 370/331 |

FOREIGN PATENT DOCUMENTS

| CN | 101321383 A | 12/2008 |
| CN | 101730315 A | 6/2010 |

OTHER PUBLICATIONS

Alcatel-Lucent. 3GPP—BBF Interworking—S9* Call Flows. 3GPP TSG SA WG2 Meeting #78. TD S2-101251. Feb. 26, 2010, URL: http://www.3gpp.org/ftp/tsg_sa/WG2_Arch/ TSGS2_78_San_Francisco/Docs/, the figure of p. 2, figure of p. 4, p. 4 paragraph 1, p. 5 paragraphs 1, 4, 6, 7, p. 6 paragraphs 1,2, p. 7 paragraph 1, p. 8 paragraphs 1-3.
International Search Report for PCT/CN2011/076185 dated Sep. 15, 2011.

* cited by examiner

*Primary Examiner* — San Htun
*Assistant Examiner* — Erica Navar
(74) *Attorney, Agent, or Firm* — Ling Wu; Stephen Yang; Ling and Yang Intellectual Property LLC

(57) ABSTRACT

A control method for H(e)NB access and a H(e)NB gateway are provided in the present invention. The method includes the following steps: a H(e)NB gateway interacting with a Broadband Policy Control Framework (BPCF) through a H(e)NB policy function, and requesting for the admission control of a fixed broadband access network; the BPCF returning the result of the admission control to the H(e)NB gateway through the H(e)NB policy function. The present invention performs policy control for the service access of the User Equipment (UE) accessing via the H(e)NB.

18 Claims, 10 Drawing Sheets

CONTROL METHOD FOR HOME BASE STATION ACCESS AND HOME BASE STATION GATEWAY

TECHNICAL FIELD

The present invention relates to the communication field, and in particular, to a control method for home evolved NodeB access and a home evolved NodeB gateway.

BACKGROUND ART

The Evolved Packet System (EPS) of the $3^{rd}$ Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW), and a Home Subscriber Server (HSS). FIG. 1 illustrates the architecture of a Home evolved NodeB (H(e)NB) accessing an EPS in a non-roaming scene according to the related art. The architecture of the EPS will be described below with reference to FIG. 1.

An MME is connected with a EUTRAN, an S-GW and a HeNB gateway (HeNB GW), and is responsible for related works of the control plane, such as mobility management, non-access layer signaling processing and management of the user mobility management context; the S-GW is an access gateway device connected with the E-UTRAN, forwards data between the E-UTRAN and a P-GW, and is responsible for caching paging waiting data; the P-GW is a border gateway between the EPS and a Packet Data Network (PDN), and is responsible for functions, such as access of the PDN and forwarding data between the EPS and PDN.

The EPS supports access of HeNBs. An HeNB is a small and low-power base station which is deployed in indoor places such as home and offices. A Closed Subscriber Group (CSG) is a new concept proposed after incorporation of the HeNB. Generally the subscribers within a home or an enterprise constitute a closed subscriber group which is identified with a CSG ID. The HeNBs serving the subscribers within this closed subscriber group have the same CSG ID. When one closed subscriber group is only served by one HeNB, the closed subscriber group can also be directly identified by the HeNB identifier (e.g. BS ID). According to the willingness of the HeNB manager, CSG subscribers and/or non-CSG subscribers can be divided into different levels, and the enjoyed service priority, quality of service and service type may be all different for different priorities.

A subscriber can access a HeNB corresponding to a plurality of closed subscriber groups, for example the subscriber's office and home and so on, through signing a contract with the operator. Therefore, a concept of allowed closed subscriber group list is introduced. The list is stored in the terminal of the subscriber and the subscriber data server at the network side.

The use modes of the HeNB are divided into three types: closed mode, hybrid mode and open mode. When a HeNB is in a closed mode, only subscribed CSG subscribers belonging to the HeNB can access the HeNB and enjoy the services provided by the HeNB. When the HeNB is in an open mode, any subscriber subscribing to the operator can access the HeNB, in which case, the HeNB is equivalent to a macro base station. When the HeNB is in a hybrid mode, any subscriber subscribing to the operator or roaming subscriber can also be allowed to gain access, but they will be differentiated in terms of levels according to the information about whether the subscribers have subscribed to the CSG, that is, the subscriber who has subscribed to the CSG has a higher service priority when using the HeNB of the hybrid mode, and enjoys better quality of service and service types.

When the subscriber performs initialized access, the subscriber data server at the network side will send the closed subscriber group, which subscribed subscribers are allowed to gain access to, to the mobility management entity of the core network. The mobility management entity of the core network will use this information to perform access control for the UE. If the UE accesses the core network from a HeNB of closed mode that has not been authorized, the core network will reject access of such subscribers.

HeNB generally accesses the core network of the EPS via a rent fixed network line (also referred to as BBF (Broadband Access)). In order to ensure security of access, a Security Gateway (SeGW) is incorporated into the core network for masking, and the data between the HeNB and SeGW will be encapsulated by using IPSec. The HeNB can be directly connected to the MME and S-GW of the core network via the IPSec tunnel established between the HeNB and SeGW, or can also be connected to the MME and S-GW further via the HeNB GW (i.e. the HeNB GW is optional in the EPS). Meanwhile, in order to achieve management for the HeNB, a network element is incorporated: Home eNodeB Management System (HeMS).

The QoS (quality of service) of the fixed network line accessed by HeNB is generally limited by the subscription of the owner of HeNB and the fixed network operator. Therefore, when the 3GPP UE accesses the 3GPP core network to access services through the HeNB, the required QoS must not exceed the subscribed QoS of the fixed network line that can be provided by the fixed network operator. Otherwise, the QoS of the UE accessing services will not be guaranteed, especially for the Guaranteed Bitrate (GBR). Therefore, as for the 3GPP network, the total QoS demand for service access of all UEs accessing through the HeNB must be controlled not to exceed the subscribed QoS guarantee of the fixed network line which the HeNB accesses.

In addition, the UE can also access the EPS via the HNB. In this case, the HNB is connected to the HNB GW, the HNB GW is connected to the SGSN, and then the SGSN is connected to the S-GW.

In addition, the Universal Mobile Telecommunications System (UMTS) also supports access of HNB (Home NodeB). FIG. 2 illustrates the architecture of an HNB accessing a UMTS in a non-roaming scene according to the related art. The architecture of FIG. 2 is the similar to that of FIG. 1, except that a Serving General packet radio service support node (SGSN) is used to replace the S-GW, and a Gateway General Packet Radio Service Supporting Node (GGSN) is used to replace P-GW. In the UMTS, the HNB GW is required. In addition, the UMTS system also supports Circuit Switch (CS) services, and the HNB GW is connected to a Mobile Switching Center (MSC).

At present, many operators pay attention to FMC (Fixed Mobile Convergence), and study on the 3GPP and BBF (Broadband Forum) interconnection and intercommunication. As for the scene where the subscriber accesses a mobile core network through a Fixed Broadband Access Network, it needs to guarantee the QoS of data in the entire transmission path (the data will be transmitted via the fixed network and mobile network). In the current technology, QoS guarantee is achieved by interaction between the Policy and Charging Rules Function (PCRF) and the BPCF (Broadband Policy Control Framework) in the Fixed Broadband Access Network. BPCF is the policy control framework in the Fixed Broadband Access Network, and for the resource request message of the PCRF, the BPCF performs resource admission control according to network policy of the Fixed Broadband Access Network, the subscription information and the like, or forwards the resource request message to other network elements (e.g. BNG) of the BBF access network, and then other network elements implement resource admission control (i.e. entrusting other network elements to implement resource admission control).

When a H(e)NB accesses via the line of a subscribed fixed broadband access network, the scene where multiple H(e)NBs (e.g. H(e)NB, HNB) access the 3GPP core network through one subscribed fixed network line must be taken into consideration. At this moment, as for the 3GPP network, the total QoS demand of service access of all User Equipments (UEs) accessing through these multiple H(e)NBs must be controlled not to exceed the subscribed QoS guarantee of the same fixed network line which these multiple H(e)NBs access.

At present, an architecture for H(e)NB access policy control has been proposed, as shown in FIG. 3. The H(e)HB Policy Function is connected to H(e)NB sub-system, and performs policy control for H(e)NB access. Wherein, H(e)NB Policy Function may be separately deployed or may be integrated into PCRF. However, the related art only provides a rough architecture, and how to implement policy control is still a problem to be solved.

SUMMARY OF THE INVENTION

The technical problem to be solved in the present invention is to provide a control method for H(e)NB access and a H(e)NB GW to implement policy control for service access of a UE accessing via a H(e)NB.

The present invention provides a control method for H(e)NB access, comprising the following steps of:

a H(e)NB GW interacting with a Broadband Policy Control Framework (BPCF) through a H(e)NB policy function, and requesting for admission control of a fixed broadband access network;

the BPCF returning a result of the admission control to the H(e)NB GW through the H(e)NB policy function.

The present invention further provides a H(e)NB GW, which is configured to: interact with a Broadband Policy Control Framework (BPCF) through a H(e)NB policy function, and request for admission control of a fixed broadband access network;

the BPCF returns a result of the admission control to the H(e)NB GW through the H(e)NB policy function.

The present invention provides a control method for H(e)NB access and a H(e)NB GW to implement policy control for service access of a UE accessing via a H(e)NB.

BRIEF DESCRIPTION OF DRAWINGS

The drawings to be described here are used to provide further understanding for the present invention, and constitute a part of the present application. The illustrative examples and description thereof in the present invention are intended to explain the present invention, rather than to improperly limit the present invention. In the drawings.

PREFERRED EMBODIMENTS OF THE PRESENT INVENTION

The present invention will be described below in detail with reference to the drawings and examples. It should be pointed out that in the case of no conflict, the examples and features therein in the present application can be combined with each other.

Figure 1:
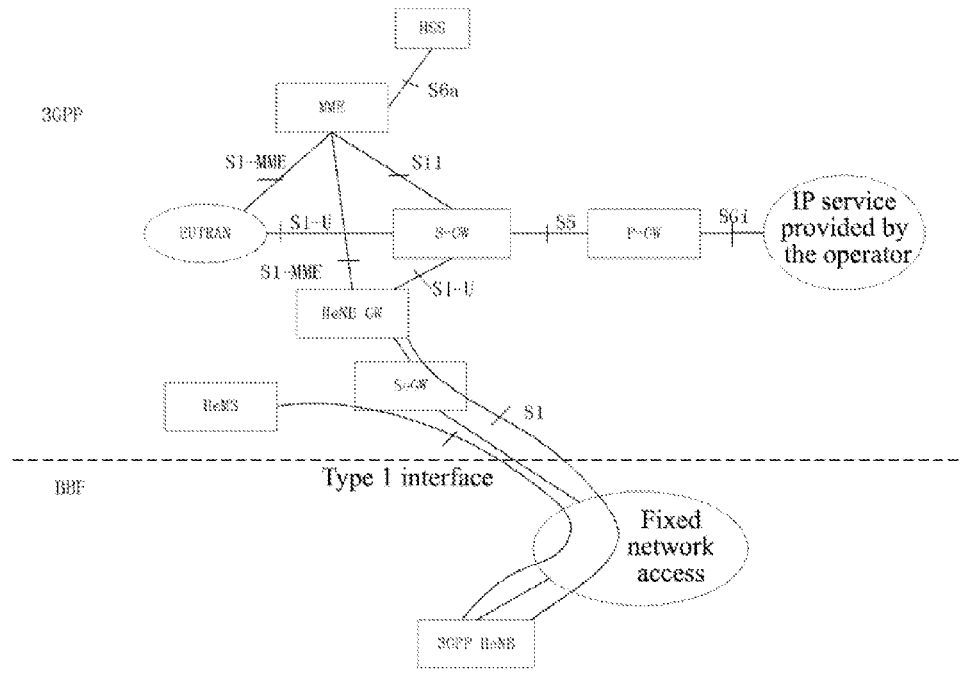
FIG. 1 illustrates the architecture of a Home evolved NodeB (HeNB) accessing an EPS in a non-roaming scene according to the related art.
Figure 2:
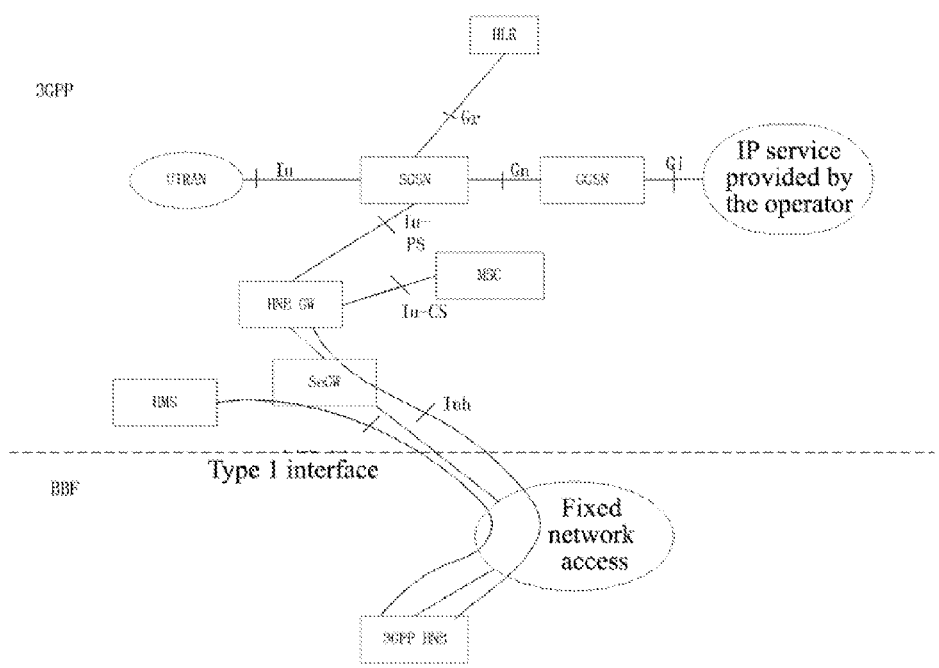
FIG. 2 illustrates the architecture of an HNB accessing a UMTS in a non-roaming scene according to the related art.
Figure 3:
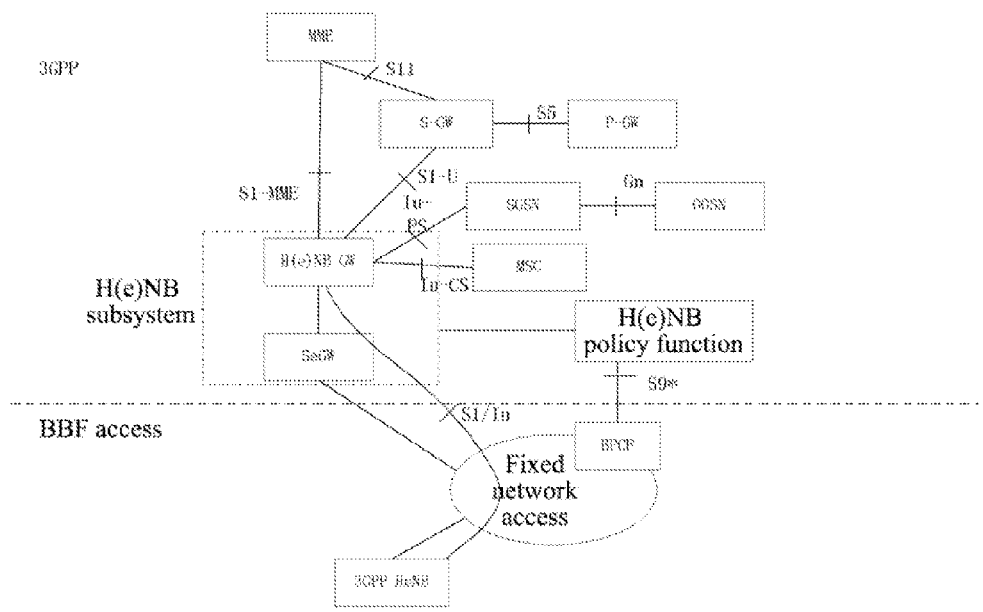
FIG. 3 is an architecture for H(e)NB access policy control in the related art.
Figure 4:
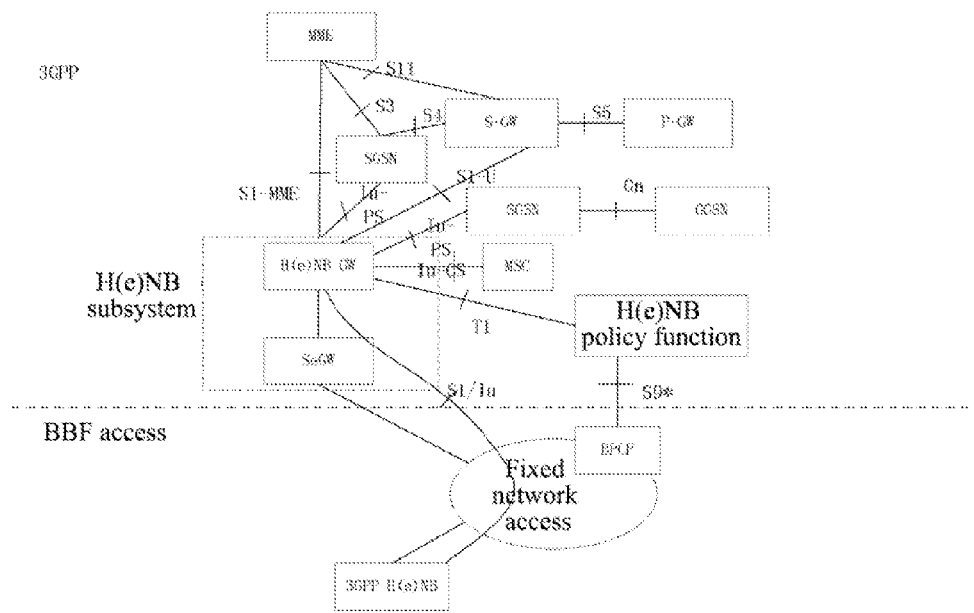
FIG. 4 is an architecture diagram one according to an example of the present invention.

FIG. 4 is an architecture 1 of the present invention. There is an H(e)NB GW in the architecture of a UE accessing an EPS via an H(e)NB. The H(e)NB Policy Function performs information interaction with the H(e)NB GW through T1 interface. The H(e)NB and SeGW may be integrated together or disposed separately.

Figure 5:
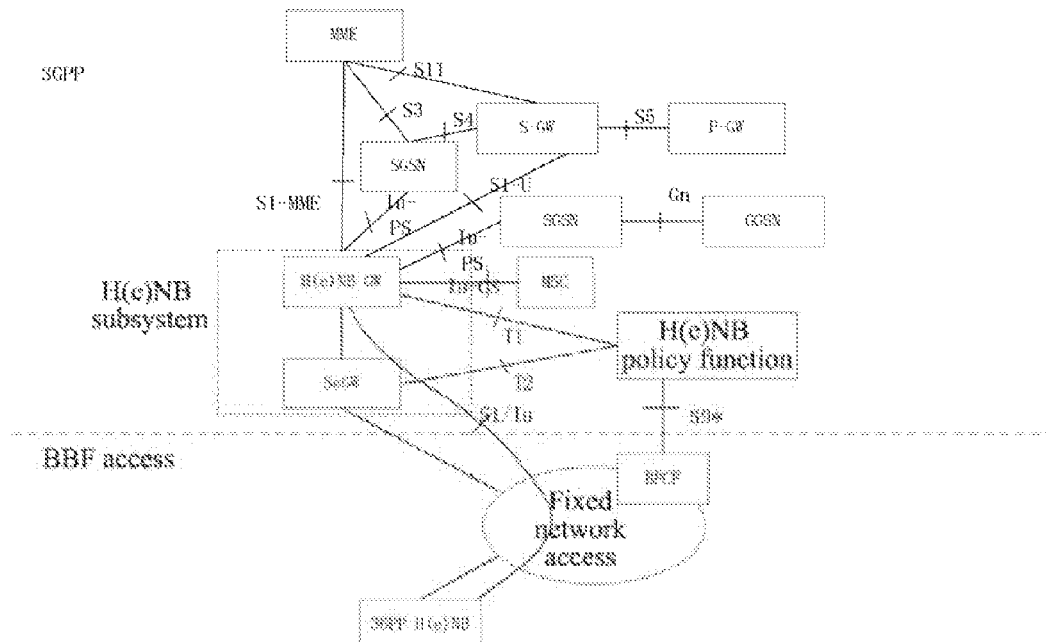
FIG. 5 is an architecture diagram two according to an example of the present invention.

FIG. 5 is an architecture 2 of the present invention. There is an H(e)NB GW in the architecture of a UE accessing an EPS via an H(e)NB. The H(e)NB Policy Function performs information interaction with the H(e)NB GW through T1 interface, and interacts with SeGW through a T2 interface. The H(e)NB and SeGW are disposed separately.

Figure 6:
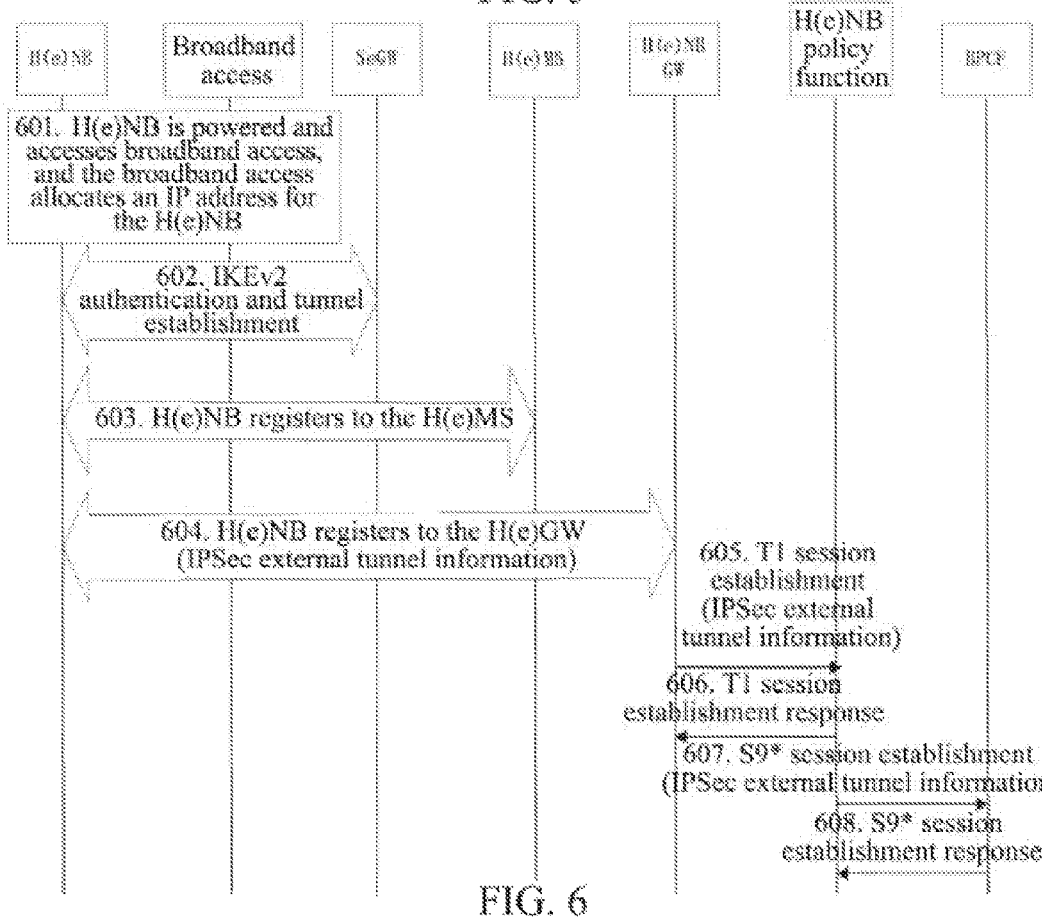
FIG. 6 is a flowchart of an BPCF acquiring H(e)NB location information in the architecture diagram one according to an example of the present invention.

FIG. 6 is an architecture based on FIG. 4. The flow for the H(e)NB Policy Function acquiring the H(e)NB location information according to an example of the present invention includes the following steps.

In step 601, after being powered, the H(e)NB interacts with broadband access. During this process, broadband access may perform access authentication to the H(e)NB. Broadband access allocates an IP address to the H(e)NB, which is represented with IP Address1.

In step 602, the H(e)NB finds out SeGW according to configuration information, and performs IKEv2 signaling interaction with the SeGW to establish IPSec SA. The source address for the H(e)NB sending IKEv2 signaling is IP Address1, and the source port number is Port1 (whose value is generally 500). Since there may exist Network Address Translation (NAT) between the H(e)NB and SeGW, the source address and source port number of the IKEv2 signaling received by the SeGW may have been translated. The source address of the IKEv2 information received by the SeGW is IP Address2, and the port number is Port2. If there is not NAT, the IP Address2 is equal to IP Address1, and Port2=Port1; if there is NAT, they are not equal. The SeGW stores IP Address2 and Port2 as IPSec external tunnel information. Wherein, the source port number Port2 is optional, i.e. when there is NAT between the H(e)NB and SeGW, the IPSec external tunnel information needs to include the source port number Port2. During this process, the H(e)NB will also request the SeGW for allocating a remote IP address for interacting with the H(e)NB GW. The IP address is represented with IP Address3. IPSec external tunnel information may further include other information, for example the destination address and destination port number of an IKV2 signaling, etc. In order to facilitate description, the source address (including two cases, i.e. there is NAT between the H(e)NB and SeGW, and there is not NAT between the H(e)NB and SeGW) of the H(e)NB obtained by the SeGW is called as H(e)NB local IP address. As for the case where there is not NAT between the H(e)NB and SeGW, the H(e)NB local IP address can be used for the fixed broadband access network to locate the H(e)NB; if there is NAT, the H(e)NB local address and source port number can be used for the fixed broadband access network to locate the H(e)NB.

In step 603, the H(e)NB interacts with the H(e)MS through IPSec SA established between the H(e)NB and the SeGW, and performs registration. The H(e)NB provides the device identifier and optional location information of the H(e)NB for the H(e)MS; the H(e)MS provides the selected address of the S1 interface, i.e. the IP address of the H(e)NB GW in this example, for the H(e)NB.

In step 604, the H(e)NB interacts with the H(e)NB GW through IPSec SA established between the H(e)NB and the SeGW, and performs registration, i.e. the H(e)NB initiates a S1 Setup flow. The H(e)NB reports the cell identifier (Cell ID) to the H(e)NB GW. If the H(e)NB supports CSG, then the H(e)NB also reports the CSG ID supported thereby. If the H(e)NB GW and the SeGW are not integrated together, the SeGW sends the IPSec external tunnel information obtained in step 602 to the H(e)NB GW;

the SeGW can send the IPSec external tunnel information to the H(e)NB GW in the following two methods: (1) firstly the IPSec external tunnel information is sent to the H(e)NB through step 603, and then the IPSec external tunnel information is sent to the H(e)NB GW by the HMNB; (2) the SeGW directly adds the IPSec external tunnel information during the S1 setup flow initiated by the H(e)NB to be sent to the H(e)NB GW; (3) the SeGW is connected to the H(e)NB, and the SeGW sends the IPSec external tunnel information to the HMNB GW through a newly defined message.

In step 605, the H(e)NB GW sends a T1 session establishment message to the H(e)NB Policy Function, wherein the message carries the IPSec external tunnel information obtained in step 602.

In step 606, the H(e)NB Policy Function stores the IPSec external tunnel information, and then returns a T1 session establishment response message to the H(e)NB GW.

In step 607, the H(e)NB Policy Function searches and obtains the address of the broadband policy control framework (BPCF) or the entry point of the fixed broadband access network where the BPCF is located according to the local configuration or DNS in accordance with the H(e)NB local IP address in the IPSec external tunnel information. The H(e)NB Policy Function sends an S9* session establishment message to the BPCF, wherein the message carries the IPSec external tunnel information.

In step 608, the BPCF returns an S9* session establishment response message to the H(e)NB Policy Function.

Figure 7:
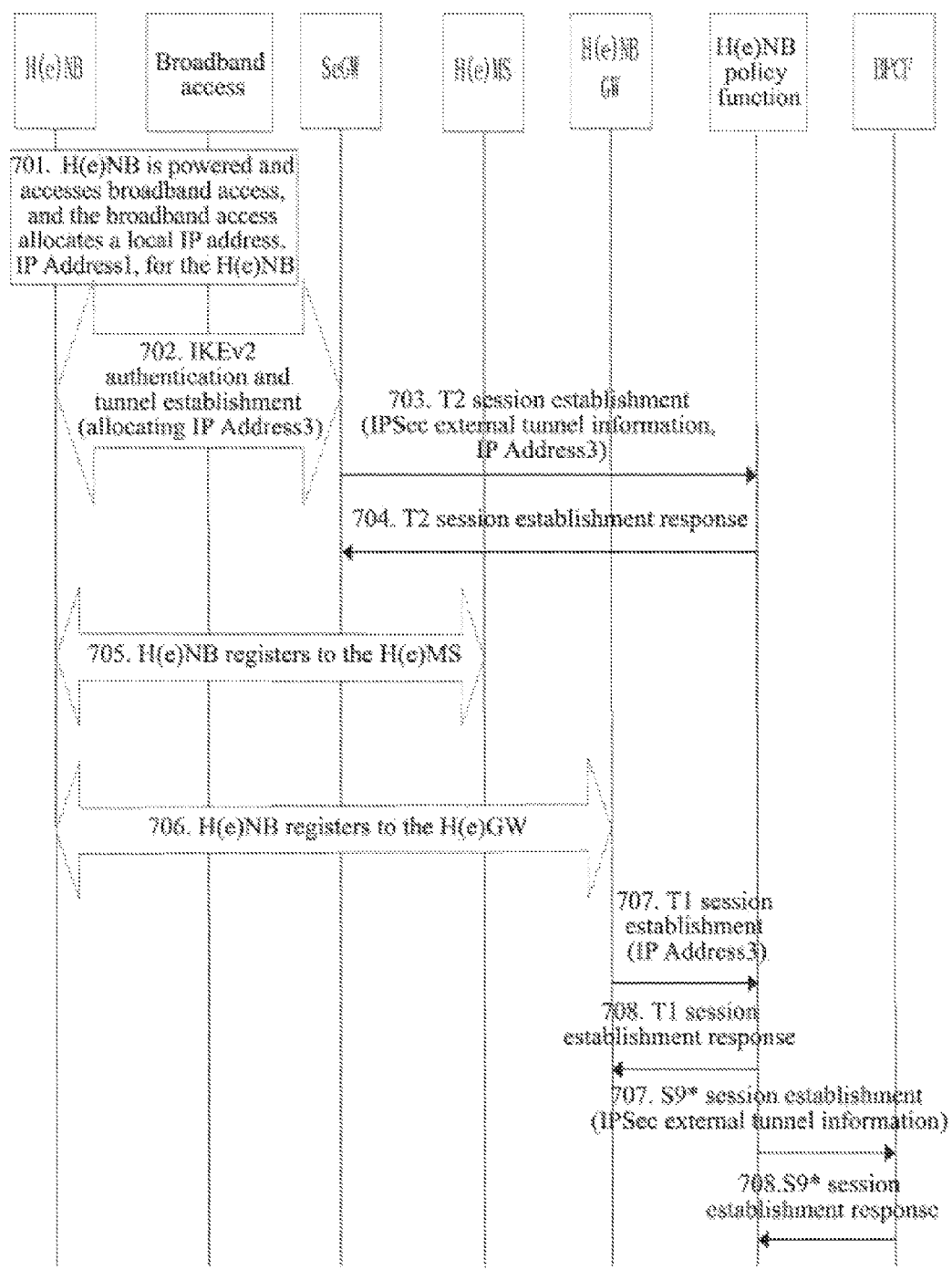
FIG. 7 is a flowchart of an BPCF acquiring H(e)NB location information in the architecture diagram two according to an example of the present invention.

FIG. 7 is an architecture based on FIG. 5. The flow for the HMNB Policy Function acquiring the HMNB location information according to an example of the present invention includes the following steps.

In step 701, after being powered, the H(e)NB interacts with broadband access. During this process, broadband access may perform access authentication to the H(e)NB. Broadband access allocates an IP address to the H(e)NB, which is represented with IP Address1.

In step 702, the H(e)NB finds out SeGW according to configuration information, and performs IKEv2 signaling interaction with the SeGW to establish IPSec SA. The source address for the H(e)NB sending IKEv2 signaling is IP Address1, and the source port number is Port1 (whose value is generally 500). Since there may exist NAT between the H(e)NB and SeGW, the source address and source port number of the IKEv2 signaling received by the SeGW may have been translated. The source address of the IKEv2 information received by the SeGW is IP Address2, and the port number is Port2. If there is not NAT, the IP Address2 is equal to IP Address1, and Port2=Port1; if there is NAT, they are not equal. The SeGW stores IP Address2 and Port2 as IPSec external tunnel information. Wherein, the source port number Port2 is optional, i.e. when there is NAT between the H(e)NB and SeGW, the IPSec external tunnel information needs to include the source port number Port2. During this process, the H(e)NB will also request the SeGW for allocating a remote IP address for interacting with the H(e)NB GW. The IP address is represented with IP Address3. IPSec external tunnel information may further include other information, for example the destination address and destination port number of an IKV2 signaling, etc. In order to facilitate description, the source address (including two cases, i.e. there is NAT between the H(e)NB and SeGW, and there is not NAT between the H(e)NB and SeGW) of the H(e)NB obtained by the SeGW is called as H(e)NB local IP address. As for the case where there is not NAT between the H(e)NB and SeGW, the H(e)NB local IP address can be used for the fixed broadband access network to locate the H(e)NB; if there is NAT, the H(e)NB local address and source port number can be used for the fixed broadband access network to locate the H(e)NB.

In step 703, the SeGW sends a T2 session establishment message to the H(e)NB Policy Function, wherein the message carries the IPSec external tunnel information and IP Address3.

In step 704, the H(e)NB Policy Function stores the IPSec external tunnel information and IP Address3, and then returns a T2 session establishment response message to the SeGW.

In step 705, the H(e)NB interacts with the H(e)MS through IPSec SA established between the H(e)NB and the SeGW, and performs registration. The H(e)NB provides the device identifier and optional location information of the H(e)NB for the H(e)MS; the H(e)MS provides the selected address of the S1 interface, i.e. the IP address of the H(e)NB GW in this example, for the H(e)NB.

In step 706, the H(e)NB interacts with the H(e)NB GW through IPSec SA established between the H(e)NB and the SeGW, and performs registration, i.e. the H(e)NB initiates a S1 Setup flow. The H(e)NB reports the cell identifier (Cell ID) to the H(e)NB GW. If the H(e)NB supports CSG, then the H(e)NB also reports the CSG ID supported thereby. The H(e)NB GW obtains the remote address IP Address3 of the H(e)NB.

In step 707, the H(e)NB GW sends to the H(e)NB Policy Function a T1 session establishment message, which carries IP Address3.

In step 708, the H(e)NB Policy Function stores information, i.e. IP Address3, and associates the T1 session with the T2 session according to the IP Address3, thereby obtaining the IPSec external tunnel information corresponding to the T2 session. The H(e)NB Policy Function returns a T1 session establishment response message.

In step 709, the H(e)NB Policy Function searches and obtains the address of the broadband policy control framework (BPCF) or the entry point of the fixed broadband access network where the BPCF is located according to the local configuration or DNS in accordance with the H(e)NB local IP address in the IPSec external tunnel information. The H(e)NB Policy Function sends an S9* session establishment message to the BPCF, wherein the message carries the IPSec external tunnel information.

In step 710, the BPCF returns an S9* session establishment response message.

When the BPCF acquires the IPSec external tunnel information according to the flow of FIG. 6 or FIG. 7, the BPCF can locate the location of H(e)NB broadband access, for example the specific line identifier and the like, according to the IPSec external tunnel information. During this process, the BPCF may interact with other network elements (for example BNG, NAT, etc.) in the broadband access to thereby obtain the resource availability situation of the broadband line which the H(e)NB accesses.

After the H(e)NB completes registration according to the flow of FIG. 6 or FIG. 7, the UE can access the H(e)NB. Based on the prior art, the UE can access the H(e)NB through an attach flow, handover flow and tracking area or routing area update flow and so on. During the process of these flows, the H(e)NB GW can obtain the subscriber CSG information. If the H(e)NB is in a closed mode, the UEs accessing the H(e)NB are all CSG subscribers, and the H(e)NB GW obtains the CSG identifier of the UEs. If the H(e)NB is in a hybrid mode, the H(e)NB GW may also obtain member indication relationship, and the indication is divided into CSG subscribers and non-CSG subscribers.

The specific method for performing policy control for H(e)NB access in the present invention in the EPS bearer establishment, deletion and modification flows will be described below with reference to FIG. 8, FIG. 9 and FIG. 10 respectively.

Figure 8:
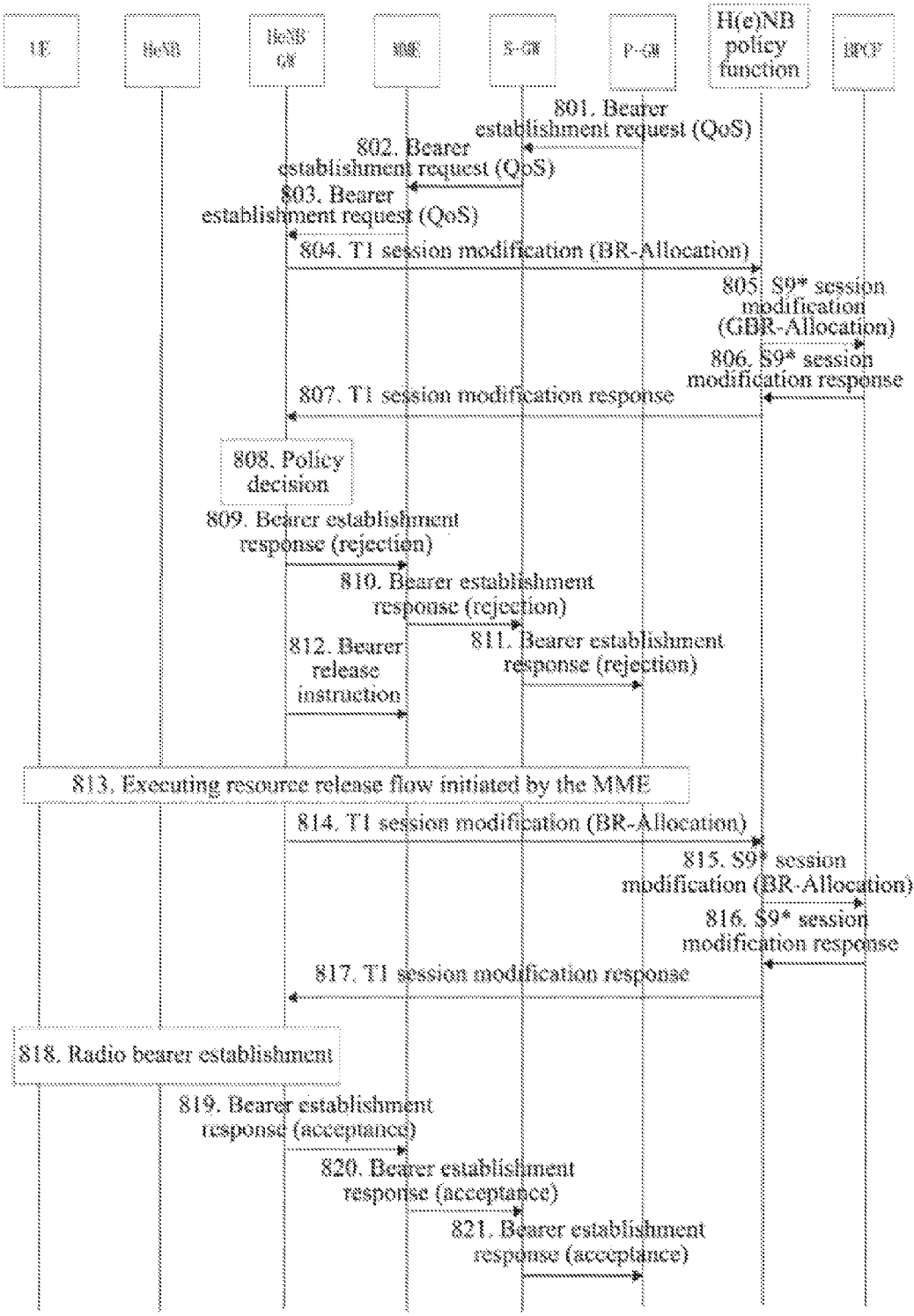
FIG. 8 is a flowchart for performing policy control during the EPS bearer establishment flow according to an example of the present invention.

FIG. 8 is the flowchart of performing policy control based on the availability situation of the broadband access line in the EPS bearer establishment flow according to an example of the present invention. This figure describes a flow of accessing a PDN connection established by the EPS through an HeNB, a UE needing to request for new QoS resources in order to access services, and the network deciding to initiate establishment of a dedicated bearer. The flow includes the following steps.

In step 801, a P-GW sends to a S-GW a bear establishment request message, which carries the QoS parameters of the bearer, including Quality Class Identifier (QCI), Allocation and Retention Priority (ARP), GBR and MBR (Maximum Bit Rate). Triggering of the P-GW is from Policy and Charging Control (PCC) provision of the PCRF, local configuration of the P-GW or QoS request of the UE.

In step 802, the S-GW sends to a MME the bear establishment request message, which carries the QoS parameters of the bearer, including QCI, ARP, GBR and MBR.

In step 803, the MME sends to an HeNB GW the bear establishment request message, which carries the QoS parameters of the bearer, including QCI, ARP, GBR and MBR.

In step 804, the HeNB GW sends to H(e)NB Policy Function a T1 session modification request message, which carries the bandwidth BR-Allocation requested to be allocated, the value of which is GBR, representing that the HeNB GW requests the H(e)NB Policy Function for allocating a bandwidth of GBR.

In step 805, the H(e)NB Policy Function sends to the BPCF an S9* session modification message, which carries bandwidth resource allocation instruction information and the bandwidth BR-Allocation requested to be allocated, the value of which is GBR, representing that the H(e)NB Policy Function requests BPCF for allocating a bandwidth of GBR.

In step 806, the BPCF executes a policy according to the request of the H(e)NB Policy Function. The BPCF or other entrusted network elements performs resource admission control according to the current available bandwidth situation of the broadband line accessed by the HeNB (i.e. the fixed broadband access network executes resource admission control). If the remaining available bandwidth is greater than or equal to BR-Allocation, then the BPCF accepts the request of the H(e)NB Policy Function, and includes all acceptance instruction in the response message returned to the H(e)NB Policy Function, and meanwhile the BPCF deducts the BR-Allocation from the current available bandwidth of the broadband line; if the remaining available bandwidth is less than BR-Allocation, the BPCF rejects the request of the H(e)NB Policy Function, and includes a rejection instruction and the bandwidth BR that can be accepted by the BPCF in the response message returned to the H(e)NB Policy Function.

In step 807, the H(e)NB Policy Function sends to the HeNB GW the acceptance or rejection instruction in the response message returned by the BPCF and the acceptable bandwidth BR returned by the BPCF.

In step 808, the HeNB GW will perform the following policy decision, i.e. executing admission control:

(a) if the HeNB GW receives all acceptance instruction, step 818 is executed;

(b) if the HeNB GW receives a rejection instruction, the HeNB GW further executes the following logic judgment:

(b1) if the access mode of the HeNB is an open mode, the HeNB GW compares the bearer with other GBR bearers established by the subscriber itself and other GBR bearers established by other subscribers accessing through the same broadband line, according to ARP:

if the bearer cannot grab other bearer resources, step 809 is executed;

if the bearer can grab other bearer resources, and the sum of the bandwidth BR' of other bearers that can be grabbed and the acceptable bandwidth BR returned by the BPCF is greater than or equal to GBR (i.e. BR'+BR>=GBR), then step 812 is executed; if BR'+BR<GBR, step 809 is executed;

(b2) if the access mode of the HeNB is a hybrid mode, and the member relationship of the UE corresponding to the bearer is non-CSG subscriber, then:

(b21) if there are other GBR bearers established by the subscriber itself or other GBR bearers established by other non-CSG subscribers accessing through the same broadband line, the HeNB GW compares bearer with other bearers according to ARP, and if the bearer cannot grab other bearer resources, step 809 is executed; if the bearer can grab other bearer resources, and the sum of the bandwidth BR' of other bearers that can be grabbed and the acceptable bandwidth BR returned by the BPCF is greater than or equal to GBR (i.e.

BR'+BR>=GBR), then step 812 is executed; if BR'+BR<GBR, step 809 is executed;

(b22) if there is no other GBR bearers established by the subscriber itself or other GBR bearers established by other non-CSG subscribers accessing through the same broadband line, step 809 is executed.

(b3) If the access mode of the HeNB is a hybrid mode, and the member relationship of the UE corresponding to the bearer is CSG subscriber, then:

(b31) if there are other GBR bearers established by other non-CSG subscribers accessing through the same broadband line, and the sum of the bearer bandwidth BR' established by other non-CSG subscribers that can be grabbed by the bearer and the acceptable bandwidth BR returned by the BPCF is greater than or equal to GBR (i.e. BR'+BR>=GBR), then step 812 is executed; if the sum of the bearer bandwidth BR' established by other non-CSG subscribers that can be grabbed and the acceptable bandwidth BR returned by the BPCF is less than GBR (i.e. BR'+BR<GBR), the HeNB GW further compares the bearer with other GBR bearers established by the subscriber itself or other bearers established by other CSG subscribers accessing through the same broadband line, according to ARP, and if the bearer cannot grab other bearer resources, step 809 is executed; if the bearer can grab other bearer resources established by CSG subscribers, and the sum of the bandwidth BR' of other bearers (including bearers established by non-CSG subscribers and bearers established by CSG subscribers) that can be grabbed and the acceptable bandwidth BR returned by the BPCF is greater than or equal to GBR (i.e. BR'+BR>=GBR), then step 812 is executed; if BR'+BR<GBR, step 809 is executed;

(b32) if there is no other GBR bearers established by other non-CSG subscribers accessing through the same subscribed fixed network line, the HeNB GW compares the bearer with other GBR bearers established by the subscriber itself or other bearers established by other CSG subscribers accessing through the same broadband line, according to ARP, and if the bearer cannot grab other bearer resources, step 809 is executed; if the bearer can grab other bearer resources, and the sum of the bandwidth BR' of other bearers that can be grabbed and the acceptable bandwidth BR returned by the BPCF is greater than or equal to GBR (i.e. BR'+BR>=GBR), then step 812 is executed; if BR'+BR<GBR, step 809 is executed;

(b4) if the access mode of the HeNB is a closed mode, the HeNB GW compares the bearer with other GBR bearers established by the subscriber itself or GBR bearers established by other subscribers accessing through the same broadband line, according to ARP, and if the bearer cannot grab other bearer resources, step 809 is executed; if the bearer can grab other bearer resources, and the sum of the bandwidth BR' of other bearers that can be grabbed and the acceptable bandwidth BR returned by the BPCF is greater than or equal to GBR (i.e. BR'+BR>=GBR), then step 812 is executed; if BR'+BR<GBR, step 809 is executed.

In other examples, when making a decision, the HeNB GW makes a decision only according to the ARP of the bearer, i.e. the bear is compared with other GBR bearers established by the subscriber itself or GBR bearers established by other subscribers accessing through the same broadband line according to ARP. If the bearer cannot grab other bearer resources, step 809 is executed; if the bearer can grab other bearer resources, and the sum of the bandwidth BR' of other bearers that can be grabbed and the acceptable bandwidth BR returned by the BPCF is greater than or equal to GBR (i.e. BR'+BR>=GBR), then step 812 is executed; if BR'+BR<GBR, step 809 is executed.

In step 809, the HeNB GW returns a bearer establishment response to the MME to reject the bearer establishment.

In step 810, the MME returns the bearer establishment response to the S-GW to reject the bearer establishment.

In step 811, the S-GW returns the bearer establishment response to the P-GW to reject the bearer establishment, and the flow ends.

In step 812, the HeNB GW sends a bearer release instruction to the MME to instruct to release the bearer bandwidth resources which the HeNB GW decides to grab in step 808.

In step 813, the MME initiates a dedicated bearer deactivation flow to release resources of other bearers that have been grabbed. This step can be implemented by using the prior art, and thus will not be described in detail here.

In step 814, if in step 808, BR'+BR=GBR, then step 818 is directly executed; if BR'+BR>GBR, than the HeNB GW sends to the H(e)NB Policy Function a T1 session modification message, which carries bandwidth resource allocation instruction information and the bandwidth BR-Allocation requested to be allocated, the value of which is GBR-BR'.

In step 815, the H(e)NB Policy Function sends to the BPCF an S9* session modification message, which carries resource allocation instruction information and the bandwidth BR-Allocation requested to be allocated, the value of which is GBR-BR'.

In step 816, the BPCF accepts the request of the H(e)NB Policy Function, and includes an acceptance instruction in the S9* session modification response message returned to the H(e)NB Policy Function, and meanwhile the BPCF deducts GBR-BR' from the current available bandwidth of the broadband line.

In step 817, the H(e)NB Policy Function returns to the HeNB GW a T1 session modification response message, which carries the acceptance instruction;

In step 818, the HeNB GW further interacts with the HeNB to establish a radio bearer.

In step 819, the HeNB GW returns a bearer establishment response message to the MME to accept bearer establishment.

In step 820, the MME returns a bearer establishment response message to the S-GW to accept bearer establishment.

In step 821, the S-GW returns a bearer establishment response message to the P-GW to accept bearer establishment.

In other examples, in step 804, in addition to the bandwidth information, the message sent by the HeNB GW to the H(e)NB Policy Function also carries QCI, ARP for requesting for QoS authorization; correspondingly, in step 805, in addition to the bandwidth information, QCI, ARP are also carried for requesting the BPCF for QoS authorization; in step 806, after the BPCF executes resource admission control (when resource admission control is implemented, in addition to considering whether the currently available remaining bandwidth can meet the requested bandwidth or not, the QCI and/or ARP will also be considered comprehensively so as to decide whether to accept or reject the QoS authorization request), the BPCF returns the QoS authorization information to the H(e)NB Policy Function, which carries an acceptance or rejection instruction, and also the acceptable bandwidth in the case of rejection instruction; in step 807, the H(e)NB Policy Function returns the QoS authorization information to the HeNB GW, which carries an acceptance or rejection instruction, and also the acceptable bandwidth in the case of rejection instruction; in step 808, the HeNB GW executes admission control according to the QoS authorization information (the executed logic judgment is identical with that in the above example).

The flow of the UE accessing the PDN connection established by the EPS through the HNB, a UE needing to request for new QoS resources in order to access services, and the network deciding to initiate the establishment of a dedicated bearer is similar to this, except that after receiving a bearer establishment request message sent by the P-GW, the S-GW sends the bearer establishment request message to the SGSN, and after receiving the message, the SGSN sends to the HNB GW a radio access bearer assignment request message to newly establish a radio bearer, and the HNB GW interacts with the BPCF to request for admission control of the fixed broadband access network. The HNB GW proceeds with the next operation according to an admission control result. In the case of acceptance, the HNB GW further interacts with the HNB to establish a radio bearer; in the case of rejection, the HNB GW further executes admission control or rejects the establishment of the radio bearer.

Figure 9:
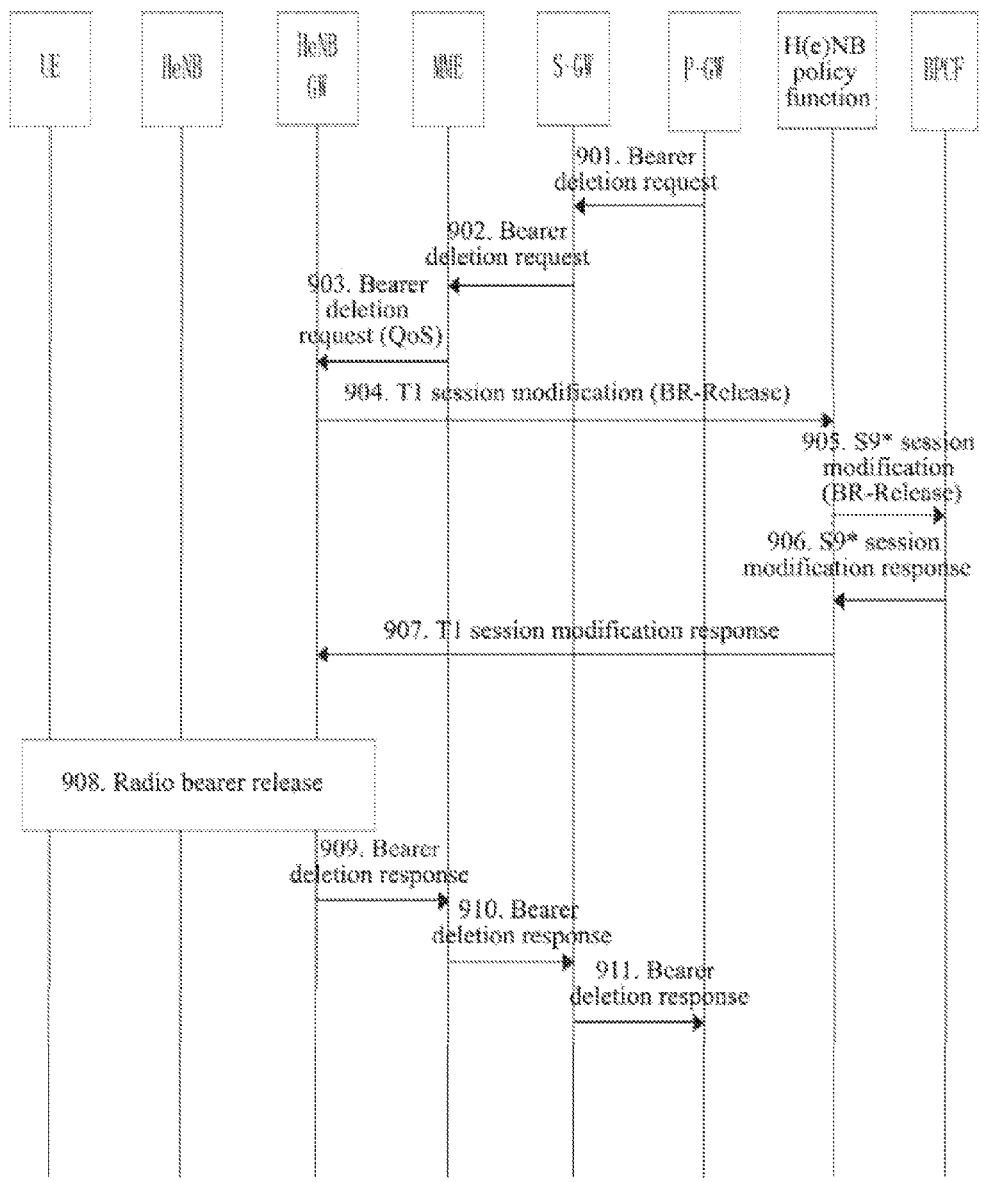
FIG. 9 is a flowchart for performing policy control during the EPS bearer release flow according to an example of the present invention.

FIG. 9 is the flowchart of performing policy control based on the availability situation of the broadband access line in the EPS bearer deletion flow according to an example of the present invention. The flow includes the following steps.

In step 901, a P-GW sends a bearer deletion request message to an S-GW. Trigging of the P-GW is from a request of a PCRF, the local configuration of the P-GW or a request of the UE. Wherein, the deleted bearer is a GBR bearer.

In step 902, the S-GW sends the bearer deletion request message to a MME.

In step 903, the MME sends the bearer deletion request message to a HeNB GW.

In step 904, the HeNB GW sends to H(e)NB Policy Function a T1 session modification message, which carries requested bandwidth resource release instruction information, and the bandwidth BR-Release requested to be released, the value of which is the GBR of the bearer requested to be deleted.

In step 905, the H(e)NB Policy Function sends to the BPCF an S9* session modification message, which carries the requested bandwidth resource release instruction information, and the bandwidth BR-Release requested to be released, the value of which is the GBR of the bearer requested to be deleted.

In step 906, the BPCF accepts the request of the H(e)NB Policy Function, and includes an acceptance instruction in the S9* session modification response message returned to the H(e)NB Policy Function, and meanwhile the BPCF adds GBR to the current available bandwidth of the broadband line.

In step 907, the H(e)NB Policy Function returns a T1 session modification response message to the HeNB GW.

In step 908, the HeNB GW allows to release the bearer (i.e. executing admission control) according to the acceptance instruction. The HeNB GW interacts with the HeNB to release the radio bearer.

In step 909, the HeNB GW returns a bearer deletion response to the MME.

In step 910, the MME returns the bearer deletion response to the S-GW.

In step 911, the S-GW returns the bearer deletion response to the P-GW.

The flow of the UE accessing the PDN connection established by the EPS through the HNB, and the network deciding to delete the bear is similar to this, except that after receiving a bearer deletion request message sent by the P-GW, the S-GW sends the bearer deletion request message to the SGSN, and after receiving the message, the SGSN sends to the HNB GW a radio access bearer assignment request message to delete the radio bearer, and the HNB GW interacts with the BPCF to request for admission control of the fixed broadband access network. The HNB GW proceeds with the next operation according to an admission control result to delete the radio bearer.

Figure 10:
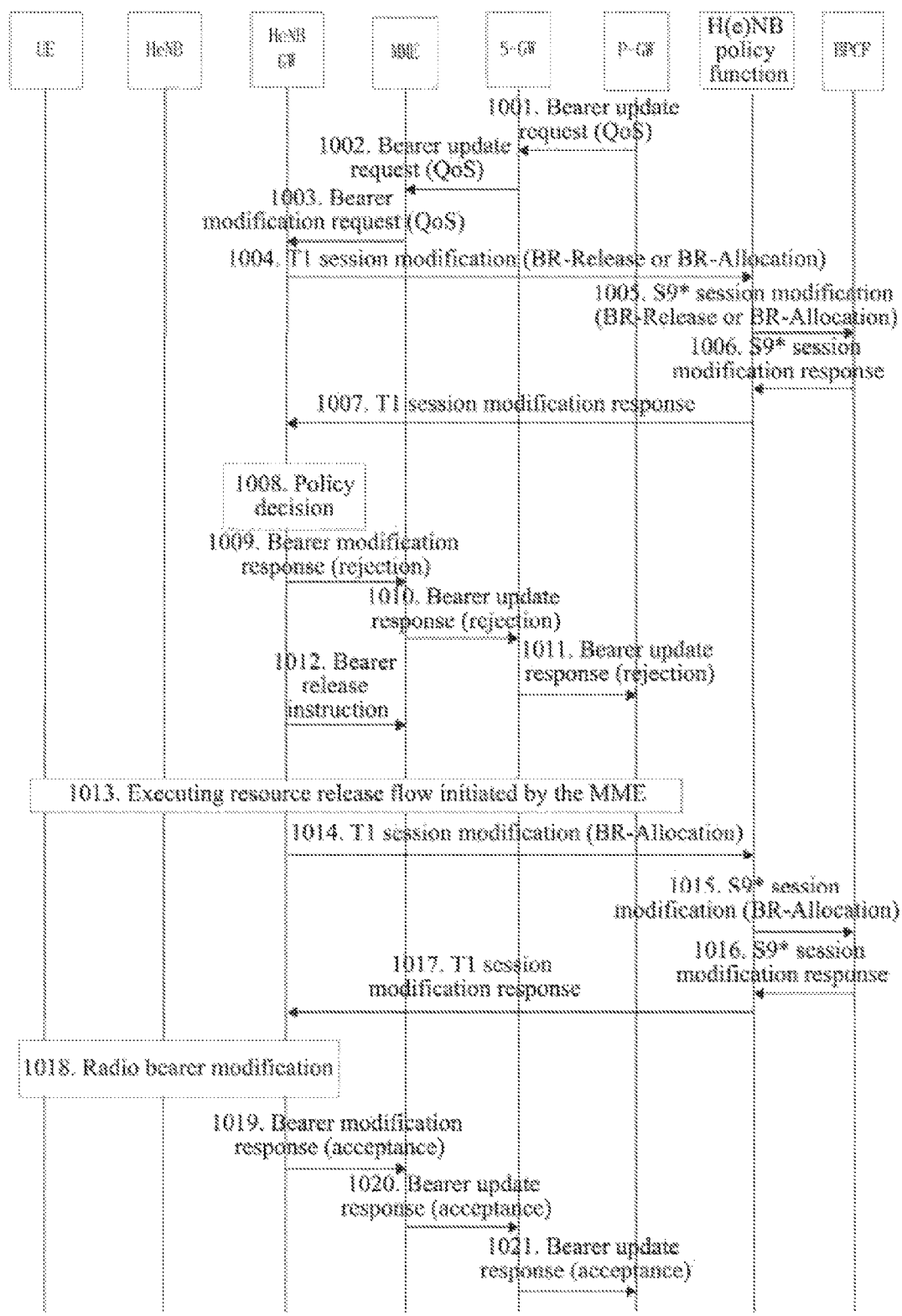
FIG. 10 is a flowchart for performing policy control during the EPS bearer update flow according to an example of the present invention.

FIG. 10 is the flowchart of performing policy control based on the availability situation of the broadband access line in the EPS bearer modification flow according to an example of the present invention. This figure describes the flow of accessing a PDN connection established by the EPS through an HeNB, a UE needing to modify allocated QoS resources in order to access services, and the network deciding to initiate modification of a dedicated bearer. This flow includes the following steps.

In step 1001, a P-GW sends to a S-GW a bear update request message, which carries the QoS parameters of the bearer, including QCI, ARP, GBR and MBR. Triggering of the P-GW is from PCC provision of the PCRF, local configuration of the P-GW or QoS request of the UE.

In step 1002, the S-GW sends to a MME the bear update request message, which carries the QoS parameters of the bearer, including QCI, ARP, GBR and MBR.

In step 1003, the MME sends to an HeNB GW a bear modification request message, which carries the QoS parameters of the bearer, including QCI, ARP, GBR and MBR.

In step 1004, the HeNB GW calculates the increment of the GBR according to the GBR before and after bearer update. If the updated GBR decreases, then the HeNB GW sends a T1 session modification request message to the H(e)NB Policy Function, carrying instruction information for requesting for resource release and the bandwidth BR-Release requested to be released, the value of which is the GBR increment; if the updated GBR increases, then the HeNB GW sends a T1 session modification request message to the H(e)NB Policy Function, carrying instruction information for requesting for resource allocation and the bandwidth BR-Allocation requested to be allocated, the value of which is the GBR increment.

In step 1005, the H(e)NB Policy Function sends to the BPCF an S9* session modification message, which carries instruction information for requesting for resource release and the bandwidth BR-Release requested to be released, or carries instruction information for requesting for resource allocation, and the bandwidth BR-Allocation requested to be allocated.

In step 1006, the BPCF executes a policy according to the request of the H(e)NB Policy Function. If instruction information for requesting for resource release is received, the BPCF directly returns a response message, which carries an acceptance instruction, and meanwhile the BPCF add available bandwidth BR-Release to the current available bandwidth of the broadband line; if an instruction for requesting for resource allocation is received, the BPCF or other entrusted network elements perform resource admission control according to the current available bandwidth situation of the broadband line accessed by the HeNB (i.e. the fixed broadband access network executes resource admission control). If the remaining available bandwidth is greater than or equal to BR-Allocation, then the BPCF accepts the request of the H(e)NB Policy Function, and includes an acceptance indication in the response message returned to the H(e)NB Policy Function, and meanwhile the BPCF deducts the BR-Allocation from the current available bandwidth of the broadband line; if the remaining available bandwidth is less than BR-Allocation, the BPCF rejects the request of the H(e)NB Policy Function, and includes a rejection indication and the bandwidth BR that can be accepted by the BPCF in the response message returned to the H(e)NB Policy Function.

In step 1007, the H(e)NB Policy Function returns to the HeNB GW a response message, which carries an acceptance instruction, or rejection instruction and the acceptable bandwidth BR returned by the BPCF.

In step 1008, the HeNB GW will perform the following policy decision, i.e. executing admission control:

(a) if the HeNB GW receives an acceptance indication, step 1018 is executed;

(b) if the HeNB GW receives a rejection indication, the HeNB GW further executes the following logic judgment:

(b1) if the access mode of the HeNB is an open mode, the HeNB GW compares the bearer with other GBR bearers established by the subscriber itself and other GBR bearers established by other subscribers accessing through the same broadband line, according to ARP, and if the bearer cannot grab other bearer resources, step 1009 is executed; if the bearer can grab other bearer resources, and the sum of the bandwidth BR' of other bearers that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed;

(b2) if the access mode of the HeNB is a hybrid mode, and the member relationship of the UE corresponding to the bearer is non-CSG subscriber, then:

(b21) if there are other GBR bearers established by the subscriber itself or other GBR bearers established by other non-CSG subscribers accessing through the same broadband line, the HeNB GW compares the bearer with other bearers according to ARP, and if the bearer cannot grab other bearer resources, step 1009 is executed; if the bearer can grab other bearer resources, and the sum of the bandwidth BR' of other bearers that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed;

(b22) if there is no other GBR bearers established by the subscriber itself or other GBR bearers established by other non-CSG subscribers accessing through the same broadband line, step 1009 is executed.

(b3) If the access mode of the HeNB is a hybrid mode, and the member relationship of the UE corresponding to the bearer is CSG subscriber, then:

(b31) if there are other GBR bearers established by other non-CSG subscribers accessing through the same broadband line, and the sum of the bearer bandwidth BR' established by other non-CSG subscribers that can be grabbed and the acceptable bandwidth BR returned by the BPCF is greater than or equal to GBR increment (i.e. BR'+BR>=GBR increment), then step 1012 is executed; if the sum of the bearer bandwidth BR' established by other non-CSG subscribers that can be grabbed and the acceptable bandwidth BR returned by the BPCF is less than GBR increment (i.e. BR'+BR<GBR increment), the HeNB GW further compares the bearer with other GBR bearers established by the subscriber itself or other bearers established by other CSG subscribers accessing through the same broadband line, according to ARP, and if the bearer cannot grab other bearer resources, step 1009 is executed; if the bearer can grab other bearer resources established by CSG subscribers, and the sum of the bandwidth BR' of other bearers (including bearers established by non-CSG subscribers and bearers established by CSG subscribers) that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed;

(b32) if there is no other GBR bearers established by non-CSG subscribers accessing through the same subscribed fixed network line, the HeNB GW compares the bearer with other GBR bearers established by the subscriber itself or other bearers established by other CSG subscribers accessing through the same broadband line, according to ARP, and if the bearer cannot grab other bearer resources, step 1009 is executed; if the bearer can grab other bearer resources, and the sum of the bandwidth BR' of other bearers that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed;

(b4) if the access mode of the HeNB is a closed mode, the HeNB GW compares the bearer with other GBR bearers established by the subscriber itself or GBR bearers established by other subscribers accessing through the same broadband line, according to ARP, and if the bearer cannot grab other bearer resources, step 1009 is executed; if the bearer can grab other bearer resources, and the sum of the bandwidth BR' of other bearers that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed.

In other examples, when making a decision, the HeNB GW makes a decision only according to the ARP, i.e. the HeNB GW compares the bear with other GBR bearers established by the subscriber itself or GBR bearers established by other subscribers accessing through the same broadband line according to ARP. If the bearer cannot grab other bearer resources, step 1009 is executed; if the bearer can grab other bearer resources, and the sum of the bandwidth BR' of other bearers that can be grabbed and the acceptable bandwidth BR returned by the BPCF is greater than or equal to GBR increment (i.e. BR'+BR>=GBR increment), then step 1012 is executed; if BR'+BR<GBR increment, step 1009 is executed.

In step 1009, the HeNB GW returns a bearer modification response to the MME to reject bearer modification.

In step 1010, the MME returns the bearer update response to the S-GW to reject the bearer update.

In step 1011, the S-GW returns the bearer update response to the P-GW to reject bearer update, and the flow ends.

In step 1012, the HeNB GW sends a bearer release instruction to the MME to instruct to release the bearer resources which the HeNB GW decides to grab in step 1008.

In step 1013, the MME initiates a dedicated bearer deactivation flow to release resources of other bearers that have been grabbed. This step can be implemented by using the prior art, and thus will not be described in detail here.

In step 1014, if in step 808, BR'+BR=GBR, then step 818 is directly executed; if BR'+BR>GBR, then the HeNB GW sends to the H(e)NB Policy Function a T1 session modification message, which carries bandwidth resource allocation instruction information and the bandwidth BR-Allocation requested to be allocated, the value of which is GBR increment-BR'.

In step 1015, the H(e)NB Policy Function sends to the BPCF an S9* session modification message, which carries resource allocation instruction information and the bandwidth BR-Allocation requested to be allocated, the value of which is GBR increment-BR'.

In step 1016, the BPCF accepts the request of the H(e)NB Policy Function, and includes an acceptance instruction in the response message returned to the H(e)NB Policy Function, and meanwhile the BPCF deducts GBR increment-BR' from the current available bandwidth of the broadband line.

In step 1017, the H(e)NB Policy Function returns to the HeNB GW a response message, which carries the acceptance instruction.

In step 1018, the HeNB GW further interacts with the HeNB to modify a radio bearer.

In step 1019, the HeNB GW returns a bearer modification response message to the MME to accept the bearer update.

In step 1020, the MME returns a bearer update response message to the S-GW to accept the bearer update.

In step 1021, the S-GW returns a bearer update response message to the P-GW to accept the bearer update.

In other examples, in step 1004, in addition to the bandwidth information, the message sent by the HeNB GW to the H(e)NB Policy Function also carries QCI, ARP for requesting for QoS authorization; correspondingly, in step 1005, in addition to the bandwidth information, QCI, ARP are also carried for requesting the BPCF for QoS authorization; in step 1006, after the BPCF executes resource admission control (when resource admission control is implemented, in addition to considering whether the currently available remaining bandwidth can meet the requested bandwidth or not, the QCI and/or ARP will also be considered comprehensively so as to decide whether to accept or reject the QoS authorization request), the BPCF returns the QoS authorization information to the H(e)NB Policy Function, which carries an acceptance or rejection instruction, and also the acceptable bandwidth in the case of rejection instruction; in step 1007, the H(e)NB Policy Function returns the QoS authorization information to the HeNB GW, which carries an acceptance or rejection instruction, and also the acceptable bandwidth in the case of rejection instruction; in step 1008, the HeNB GW executes admission control according to the QoS authorization information (the executed logic judgment is identical with that in the above example).

The flow of the UE accessing the PDN connection established by the EPS through the HNB, a UE needing to modify allocated QoS resources in order to access services, and the network deciding to modify a dedicated bearer is similar to this, except that after receiving a bearer update request message sent by the P-GW, the S-GW sends the bearer update request message to the SGSN, and after receiving the message, the SGSN sends to the HNB GW a radio access bearer assignment request message to modify the radio bearer, and the HNB GW interacts with the BPCF to request for admission control of the fixed broadband access network. The HNB GW proceeds with the next operation according to an admission control result. In the case of acceptance, the HNB GW further interacts with the HNB to update the radio bearer; in the case of rejection, the HNB GW further executes admission control or rejects modification of the radio bearer.

The scheme of implementing policy control for access via an HNB in the present invention will be described in terms of Packet Data Protocol (PDP) context activation, deactivation and modification flows respectively in UMTS with reference to FIG. 11, FIG. 12 and FIG. 13.

Figure 11:
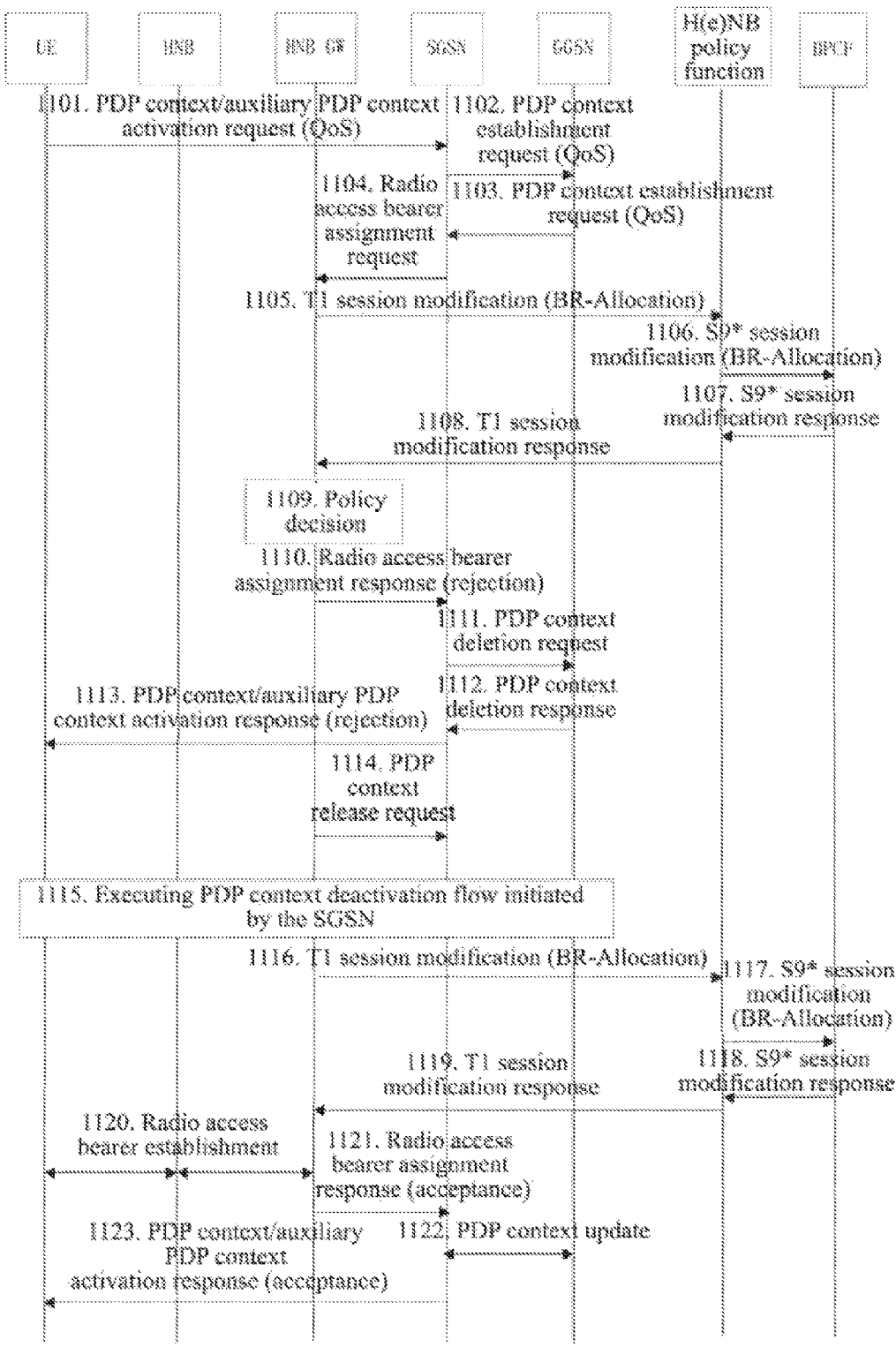
FIG. 11 is a flowchart for performing policy control during the UMTS bearer establishment flow according to an example of the present invention.

FIG. 11 is the flowchart of performing policy control based on the availability situation of the broadband access line in the PDP context activation flow in a UMTS according to an example of the present invention. This figure describes a flow of accessing a PDN connection established by an EPS through an HNB, a UE needing to request for new QoS resources in order to access services, and requesting for activation of PDP context. The flow includes the following steps.

In step 1101, a UE sends to an SGSN a PDP context activation or auxiliary PDP context activation request message, which carries the QoS parameters requested by the UE, including requested Guaranteed Bitrate (GBR) and Allocation and Retention Priority (ARP). Request triggering of the UE is from a GGSN request or internal triggering of the UE.

In step 1102, after verifying the request message received in step 1101, the SGSN sends to a GGSN a PDP context establishment request message, which carries QoS parameters, including GBR and ARP.

In step 1103, the GGSN returns a PDP context establishment response message to the SGSN.

In step 1104, the SGSN sends to an HNB GW a radio access bearer assignment request message, which carries QoS parameters that have been authorized by the core network, including the requested Guaranteed Bitrate (GBR) and Allocation and Retention Priority (ARP).

In step 1105, the HNB GW sends to H(e)NB Policy Function a T1 session modification request message, which carries the bandwidth BR-Allocation requested to be allocated, the value of which is GBR, representing that the HNB GW requests the H(e)NB Policy Function for allocating a bandwidth of GBR.

In step 1106, the H(e)NB Policy Function sends to the BPCF an S9* session modification message, which carries bandwidth resource allocation indication information, and the bandwidth BR-Allocation requested to be allocated, the value of which is GBR, representing that the H(e)NB Policy Function requests BPCF for allocating a bandwidth of GBR.

In step 1107, the BPCF executes a policy according to the request of the H(e)NB Policy Function. The BPCF or other entrusted network elements perform resource admission control according to the current available bandwidth situation of the broadband line accessed by the HNB (i.e. the fixed broadband access network executes resource admission control). If the remaining available bandwidth is greater than or equal to BR-Allocation, then the BPCF accepts the request of the H(e)NB Policy Function, and includes an acceptance indication in the response message returned to the H(e)NB Policy Function, and meanwhile the BPCF deducts the BR-Allocation from the current available bandwidth of the broadband line; if the remaining available bandwidth is less than BR-Allocation, the BPCF rejects the request of the H(e)NB Policy Function, and includes a rejection indication and the bandwidth BR that can be accepted by the BPCF in the response message returned to the H(e)NB Policy Function.

In step 1108, the H(e)NB Policy Function sends to the HNB GW the acceptance or rejection indication carried in the S9* session response message returned by the BPCF and the acceptable bandwidth BR returned by the BPCF.

In step 1109, the HNB GW will perform the following policy decision, i.e. executing admission control:

(a) if the HNB GW receives an acceptance indication, step 1120 is executed;

(b) if the HNB GW receives a rejection indication, the HNB GW further executes the following logic judgment:

(b1) if the access mode of the HNB is an open mode, the HNB GW compares the PDP context with other PDP contexts of GBR activated by the subscriber itself and other PDP contexts of GBR activated by other subscribers accessing through the same broadband line, according to ARP, and if the PDP context cannot grab other PDP context resources, step 1110 is executed; if the PDP context can grab other PDP context resources, and the sum of the bandwidth BR' of other PDP contexts that can be grabbed and the acceptable bandwidth BR returned by the BPCF is greater than or equal to GBR (i.e. BR'+BR>=GBR), then step 1114 is executed; if BR'+BR<GBR, step 1110 is executed;

(b2) if the access mode of the HNB is a hybrid mode, and the member relationship of the UE corresponding to the PDP context is non-CSG subscriber, then:

(b21) if there are other PDP contexts of GBR activated by the subscriber itself or other PDP contexts of GBR activated by other non-CSG subscribers accessing through the same broadband line, the HNB GW compares the PDP context with other PDP contexts according to ARP, and if the PDP context cannot grab other PDP context resources, step 1110 is executed; if the PDP context can grab other PDP context resources, and the sum of the bandwidth BR' of other PDP contexts that can be grabbed and the acceptable bandwidth BR returned by the BPCF is greater than or equal to GBR (i.e. BR'+BR>=GBR), then step 1114 is executed; if BR'+BR<GBR, step 1110 is executed;

(b22) if there is no other PDP contexts of GBR activated by the subscriber itself or other PDP contexts of GBR activated by other non-CSG subscribers accessing through the same broadband line, step 1110 is executed.

(b3) If the access mode of the HNB is a hybrid mode, and the member relationship of the UE corresponding to the PDP context is CSG subscriber, then:

(b31) if there are other PDP contexts of GBR activated by other non-CSG subscribers accessing through the same broadband line, and the sum of the bandwidth BR' of PDP contexts activated by other non-CSG subscribers that can be grabbed and the acceptable bandwidth BR returned by the BPCF is greater than or equal to GBR (i.e. BR'+BR>=GBR), then step 1114 is executed; if the sum of the bandwidth BR' of PDP contexts activated by other non-CSG subscribers that can be grabbed and the acceptable bandwidth BR returned by the BPCF is less than GBR (i.e. BR'+BR<GBR), the HNB GW further compares the PDP context with other PDP contexts of GBR activated by the subscriber itself or other PDP contexts of GBR activated by other CSG subscribers accessing through the same broadband line, according to ARP, and if the PDP context cannot grab other PDP context resources, step 1110 is executed; if the PDP context can grab other PDP context resources of GBR activated by other CSG subscribers, and the sum of the bandwidth BR' of other PDP contexts (including PDP contexts activated by non-CSG subscribers and PDP contexts activated by CSG subscribers) that can be grabbed and the acceptable bandwidth BR returned by the BPCF is greater than or equal to GBR (i.e. BR'+BR>=GBR), then step 1114 is executed; if BR'+BR<GBR, step 1110 is executed;

(b32) if there is no other PDP contexts of GBR activated by non-CSG subscribers accessing through the same subscribed fixed network line, then the HNB GW compares the PDP context with other PDP contexts of GBR activated by the subscriber itself or other PDP contexts of GBR activated by other CSG subscribers accessing through the same broadband line according to ARP, and if the PDP context cannot grab other PDP context resources, step 1110 is executed; if the PDP context can grab other PDP context resources, and the sum of the bandwidth BR' of other PDP contexts that can be grabbed and the acceptable bandwidth BR returned by the BPCF is greater than or equal to GBR (i.e. BR'+BR>=GBR), then step 1114 is executed; if BR'+BR<GBR, step 1110 is executed;

(b4) if the access mode of the HNB is a closed mode, the HNB GW compares the PDP context with other PDP contexts of GBR activated by the subscriber itself or PDP contexts of GBR activated by other subscribers accessing through the same broadband line according to ARP, and if the PDP context cannot grab other PDP context resources, step 1110 is executed; if the PDP context can grab other PDP context resources, and the sum of the bandwidth BR' of other PDP contexts that can be grabbed and the acceptable bandwidth BR returned by the BPCF is greater than or equal to GBR (i.e. BR'+BR>=GBR), then step 1114 is executed; if BR'+BR<GBR, step 1110 is executed.

In other examples, when making a decision, the HNB GW makes a decision only according to the ARP, i.e. the HNB GW compares the PDP context with other PDP contexts of GBR activated by the subscriber itself or PDP contexts of GBR activated by other subscribers accessing through the same broadband line according to ARP, and if the PDP context cannot grab other PDP context resources, step 1110 is executed; if the PDP context can grab other PDP context resources, and the sum of the bandwidth BR' of other PDP contexts that can be grabbed and the acceptable bandwidth BR returned by the BPCF is greater than or equal to GBR (i.e. BR'+BR>=GBR), then step 1114 is executed; if BR'+BR<GBR, step 1110 is executed.

In step 1110, the HNB GW returns to the SGSN a radio access bearer assignment response, which carries a rejection instruction to inform the SGSN of failure of radio resource allocation.

In step 1111, the SGSN sends a PDP context deletion request to the GGSN.

In step 1112, the GGSN returns a PDP context deletion response to the SGSN.

In step 1113, the SGSN returns to the UE a PDP context activation or auxiliary PDP context request response, which carries a rejection instruction to inform the UE of failure of PDP context activation, and the flow ends.

In step 1114, the HNB GW sends a PDP context release instruction to the SGSN to instruct to release the PDP context bandwidth resources which the HNB GW decides to grab in step 1109.

In step 1115, the SGSN initiates a PDP context deactivation flow to release other PDP context resources that have been grabbed. This step can be implemented by using the prior art, and thus will not be described in detail here.

In step 1116, if in step 1109, BR'+BR=GBR, then step 1120 is directly executed; if BR'+BR>GBR, then the HNB GW sends to the H(e)NB Policy Function a T1 session modification message, which carries bandwidth resource allocation instruction information and the bandwidth BR-Allocation requested to be allocated, the value of which is GBR-BR'.

In step 1117, the H(e)NB Policy Function sends to the BPCF an S9* session modification message, which carries resource allocation instruction information and the bandwidth BR-Allocation requested to be allocated, the value of which is GBR-BR'.

In step 1118, the BPCF accepts the request of the H(e)NB Policy Function, and includes an acceptance instruction in the response message returned to the H(e)NB Policy Function, and meanwhile the BPCF deducts GBR-BR' from the current available bandwidth of the broadband line.

In step 1119, the H(e)NB Policy Function returns to the HNB GW a response message, which carries the acceptance instruction.

In step 1120, the HNB GW further interacts with the HNB to establish a radio bearer.

In step 1121, the HNB GW returns a radio access bearer assignment response to the SGSN, carrying an acceptance instruction.

In step 1122, the SGSN interacts with the GGSN to update the PDP context, and informs the success of radio resource allocation.

In step 1123, the SGSN returns to UE a PDP context activation or auxiliary PDP context activation response message, which carries an acceptance instruction, and the flow ends.

In other examples, in step 1105, in addition to the bandwidth information, the message sent by the HNB GW to the H(e)NB Policy Function also carries other QoS parameters issued by the core networks, for example QCI (or referred to as Traffic Class) and ARP, for requesting for QoS authorization; correspondingly, in step 1106, in addition to the bandwidth information, other QoS parameters issued by the core networks, for example QCI and ARP, are also carried for requesting the BPCF for QoS authorization; in step 1107, after the BPCF executes resource admission control (when resource admission control is implemented, in addition to considering whether the currently available remaining bandwidth can meet the requested bandwidth or not, the QCI and/or ARP will also be considered comprehensively so as to decide whether to accept or reject the QoS authorization request), the BPCF returns the QoS authorization information to the H(e)NB Policy Function, which carries an acceptance or rejection instruction, and also the acceptable bandwidth in the case of rejection instruction; in step 1108, the H(e)NB Policy Function returns the QoS authorization information to the HNB GW, which carries an acceptance or rejection instruction, and also the acceptable bandwidth in the case of rejection instruction; in step 1109, the HNB GW executes admission control according to the QoS authorization information (the executed logic judgment is identical with that in the above example).

In addition, as for 3G CS services, the MSC will also send to the HNB GW the radio access bearer assignment request message, which carries QoS parameters authorized by the core network, for example QCI, ARP, GBR, etc. Afterwards, the flow of the HNB GW requesting the fixed broadband access network for admission control through the H(e)NB Policy Function is similar to the above flow.

Figure 12:
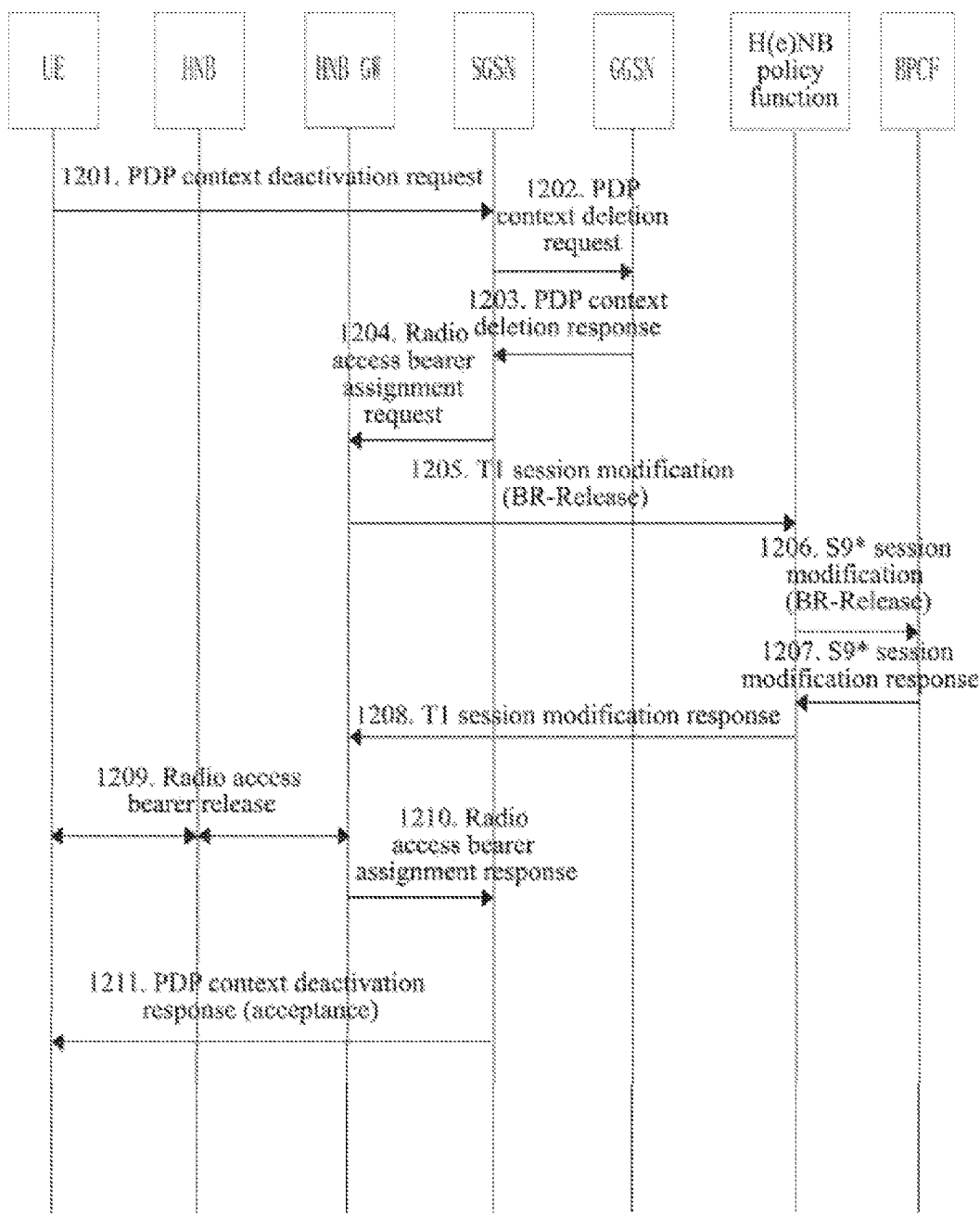
FIG. 12 is a flowchart for performing policy control during the UMTS bearer release flow according to an example of the present invention.

FIG. 12 is the flowchart of performing policy control based on the availability situation of the broadband access line in the PDP context deactivation flow in a UMTS according to an example of the present invention.

In step 1201, a UE sends to an SGSN a PDP context deactivation request message. Request triggering of the UE is from a GGSN request or internal triggering of the UE.

In step 1202, the SGSN sends a PDP context deletion request message to a GGSN.

In step 1203, the GGSN returns a PDP context deletion response message to the SGSN.

In step 1204, the SGSN sends to an HNB GW a radio access bearer assignment request message to request for release of radio access bearer resources.

In step 1205, the HNB GW sends to H(e)NB Policy Function a T1 session modification request message, which carries requested bandwidth resource release instruction information, and the bandwidth BR-Release requested to be released, the value of which is the GBR of the PDP context requested to be deactivated.

In step 1206, the H(e)NB Policy Function sends to the BPCF an S9* session modification message, which carries the requested bandwidth resource release instruction information, and the bandwidth BR-Release requested to be released, the value of which is the GBR of the PDP context requested to be deactivated.

In step 1207, the BPCF accepts the request of the H(e)NB Policy Function, and includes an acceptance instruction in the response message returned to the H(e)NB Policy Function, and meanwhile the BPCF adds GBR to the current available bandwidth of the broadband line.

In step 1208, the H(e)NB Policy Function returns a response message to the HNB GW.

In step 1209, the HNB GW allows to release the bearer (i.e. executing admission control) according to the acceptance instruction. The HNB GW interacts with the HNB to release the radio bearer.

In step 1210, the HNB GW returns a radio access bearer assignment response to the SGSN.

In step 1211, the SGSN returns a PDP context deactivation response to the UE.

In addition, as for 3G CS services, the MSC will also send to the HNB GW the radio access bearer assignment request message to request for release of radio access bearer resources. Afterwards, the flow of the HNB GW requesting the fixed broadband access network for admission control through the H(e)NB Policy Function is similar to the above flow.

Figure 13:
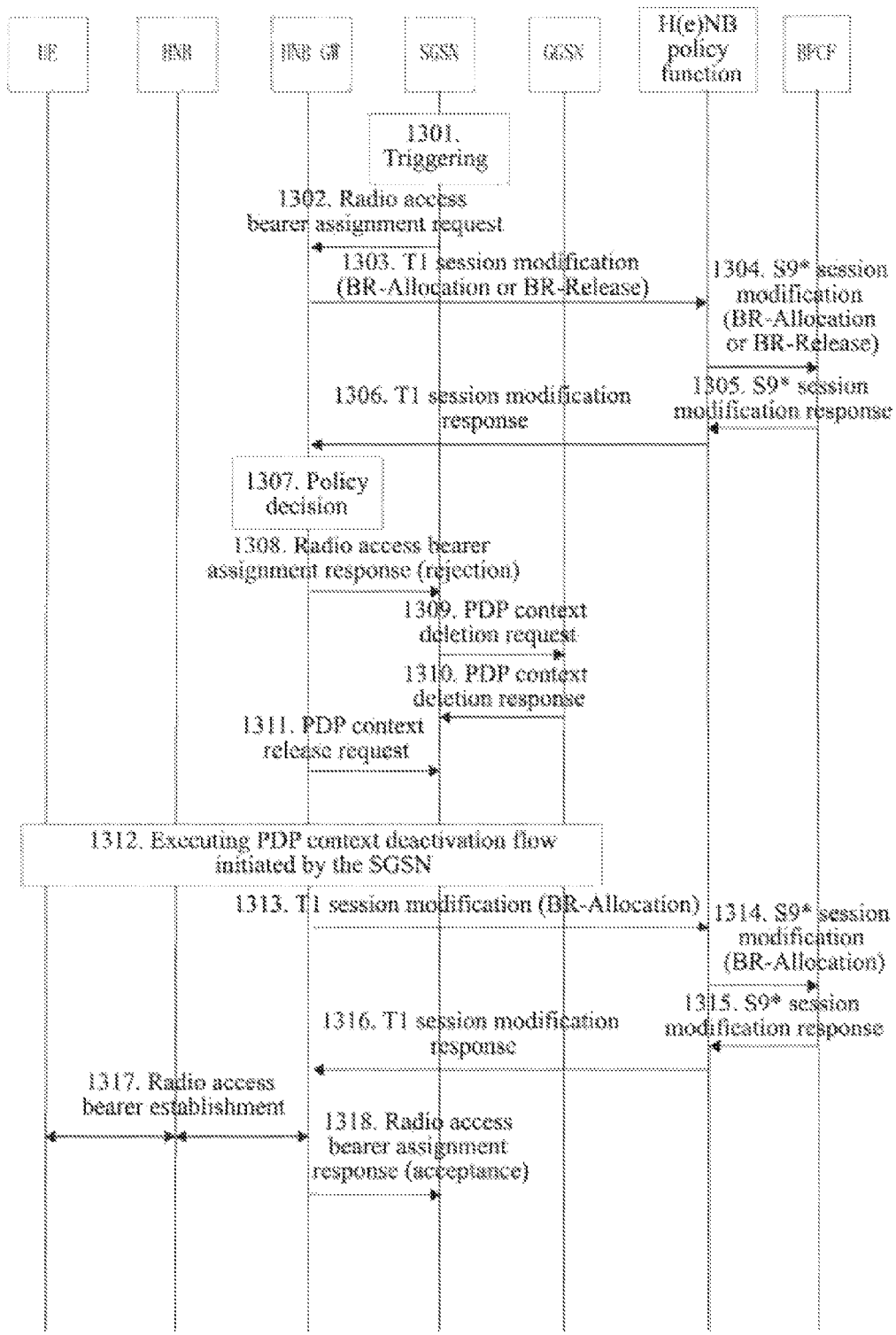
FIG. 13 is a flowchart for performing policy control during the UMTS bearer update flow according to an example of the present invention.

FIG. 13 is the flowchart of performing policy control based on the availability situation of the broadband access line in the PDP context modification flow in a UMTS according to an example of the present invention. This figure describes a flow of accessing a PDN connection established by an EPS through an HNB, a UE needing to request for modifying allocated QoS resources in order to access services, and requesting for modification of a PDP context. This flow includes the following steps.

In step 1301, an SGSN receives triggering, and requests for modifying QoS parameters of the PDP context, including new GBR. The triggering is from a GGSN request or a request of the UE or internal triggering of the SGSN.

In step 1302, the SGSN sends to an HNB GW a radio access bearer assignment request message, which carries new QoS parameters, including the requested Guaranteed Bitrate (GBR) and Allocation and Retention Priority (ARP).

In step 1303, the HNB GW calculates the increment of the GBR according to the GBR before and after PDP context update. If the updated GBR decreases, then the HNB GW sends a T1 session modification request message to the H(e)NB Policy Function, carrying instruction information for requesting for resource release and the bandwidth BR-Release requested to be released, the value of which is the GBR increment; if the updated GBR increases, then the HNB GW sends a T1 session modification request message to the H(e)NB Policy Function, carrying instruction information for requesting for resource allocation and the bandwidth BR-Allocation requested to be allocated, the value of which is the GBR increment.

In step 1304, the H(e)NB Policy Function sends to the BPCF an S9* session modification message, which carries instruction information for requesting for resource release and the bandwidth BR-Release requested to be released, or carries instruction information for requesting for resource allocation, and the bandwidth BR-Allocation requested to be allocated.

In step 1305, the BPCF executes a policy according to the request of the H(e)NB Policy Function, wherein:

if instruction information for requesting for resource release is received, the BPCF directly returns a response message, which carries an acceptance instruction, and meanwhile the BPCF add available bandwidth BR-Release to the current available bandwidth of the broadband line;

if an instruction for requesting for resource allocation is received, the BPCF or other entrusted network elements perform resource admission control according to the current available bandwidth situation of the broadband line accessed by the HNB (i.e. the fixed broadband access network executes resource admission control). If the remaining available bandwidth is greater than or equal to BR-Allocation, then the BPCF accepts the request of the H(e)NB Policy Function, and includes an acceptance indication in the response message returned to the H(e)NB Policy Function, and meanwhile the BPCF deducts the BR-Allocation from the current available bandwidth of the broadband line; if the remaining available bandwidth is less than BR-Allocation, the BPCF rejects the request of the H(e)NB Policy Function, and includes a rejection indication and the bandwidth BR that can be accepted by the BPCF in the response message returned to the H(e)NB Policy Function.

In step 1306, the H(e)NB Policy Function returns to the HNB GW a response message, which carries an acceptance instruction, or rejection instruction and the acceptable bandwidth BR returned by the BPCF.

In step 1307, the HNB GW will perform the following policy decision, i.e. executing admission control:

(a) if the HNB GW receives an acceptance indication, step 1317 is executed;

(b) if the HNB GW receives a rejection indication, the HNB GW further executes the following logic judgment:

(b1) if the access mode of the HNB is an open mode, the HNB GW compares the PDP context with other PDP contexts of GBR activated by the subscriber itself and other PDP contexts of GBR activated by other subscribers accessing through the same broadband line, according to ARP, and if the PDP context cannot grab other PDP context resources, step 1308 is executed; if the PDP context can grab other bearer resources, and the sum of the bandwidth BR' of other PDP contexts that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed;

(b2) if the access mode of the HNB is a hybrid mode, and the member relationship of the UE corresponding to the PDP context is non-CSG subscriber, then:

(b21) if there are other PDP contexts of GBR activated by the subscriber itself or other PDP contexts of GBR activated by other non-CSG subscribers accessing through the same broadband line, the HNB GW compares the PDP context with other PDP contexts according to ARP, and if the PDP context cannot grab other PDP context resources, step 1308 is executed; if the PDP context can grab other PDP context resources, and the sum of the bandwidth BR' of other PDP contexts that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed;

(b22) if there is no other PDP contexts of GBR activated by the subscriber itself or other PDP contexts of GBR activated by other non-CSG subscribers accessing through the same broadband line, step 1308 is executed.

(b3) If the access mode of the HNB is a hybrid mode, and the member relationship of the UE corresponding to the PDP context is CSG subscriber, then:

(b31) if there are other PDP contexts of GBR activated by other non-CSG subscribers accessing through the same broadband line, and the sum of the bandwidth BR' of PDP contexts activated by other non-CSG subscribers that can be grabbed and the acceptable bandwidth BR returned by the BPCF is greater than or equal to GBR increment (i.e. BR'+BR>=GBR increment), then step 1311 is executed; if the sum of the bandwidth BR' of PDP contexts activated by other non-CSG subscribers that can be grabbed and the acceptable bandwidth BR returned by the BPCF is less than GBR increment (i.e. BR'+BR<GBR increment), the HNB GW further compares the PDP context with other PDP contexts of GBR activated by the subscriber itself or other PDP contexts of GBR activated by other CSG subscribers accessing through the same broadband line, according to ARP, and if the PDP context cannot grab other PDP context resources, step 1308 is executed; if the PDP context can grab other PDP context resources of GBR activated by CSG subscribers, and the sum of the bandwidth BR' of other PDP contexts (including PDP contexts activated by non-CSG subscribers and PDP contexts activated by CSG subscribers) that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed;

(b32) if there is no other PDP contexts of GBR activated by non-CSG subscribers accessing through the same subscribed fixed network line, then the HNB GW compares the PDP context with other PDP contexts of GBR activated by the subscriber itself or other PDP contexts of GBR activated by other CSG subscribers accessing through the same broadband line according to ARP, and if the PDP context cannot grab other PDP context resources, step 1308 is executed; if the PDP context can grab other PDP context resources, and the sum of the bandwidth BR' of other PDP contexts that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed;

(b4) if the access mode of the HNB is a closed mode, the HNB GW compares the PDP context with other PDP contexts of GBR activated by the subscriber itself or PDP contexts of GBR activated by other subscribers accessing through the same broadband line according to ARP, and if the PDP context cannot grab other PDP context resources, step 1308 is executed; if the PDP context can grab other PDP context resources, and the sum of the bandwidth BR' of other PDP contexts that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed;

In other examples, when making a decision, the HNB GW makes a decision only according to the ARP, i.e. the HNB GW compares the PDP context with other PDP contexts of GBR activated by the subscriber itself or PDP contexts of GBR activated by other subscribers accessing through the same broadband line according to ARP, and if the PDP context cannot grab other PDP context resources, step 1308 is executed; if the PDP context can grab other PDP context resources, and the sum of the bandwidth BR' of other PDP contexts that can be grabbed and the acceptable bandwidth BR returned by the BPCF is greater than or equal to GBR increment (i.e. BR'+BR>=GBR increment), then step 1311 is executed; if BR'+BR<GBR increment, step 1308 is executed.

In step 1308, the HNB GW returns to the SGSN a radio access bearer assignment response, which carries a rejection instruction to inform the SGSN of failure of radio resource allocation.

In step 1309, the SGSN sends a PDP context deletion request to the GGSN.

In step 1310, the GGSN returns a PDP context deletion response to the SGSN. If the triggering in step 1301 is from outside (for example the UE or the GGSN), then the SGSN further feeds it back to the triggering sending party, and the flow ends.

In step 1311, the HNB GW sends a PDP context release instruction to the SGSN to instruct to release the PDP context bandwidth resources which the HNB GW decides to grab in step 1307.

In step 1312, the SGSN initiates a PDP context deactivation flow to release other PDP context resources that have been grabbed. This step can be implemented by using the prior art, and thus will not be described in detail here.

In step 1313, if in step 1307, BR'+BR=GBR increment, then step 1317 is directly executed; if BR'+BR>GBR increment, then the HNB GW sends to the H(e)NB Policy Function a T1 session modification message, which carries bandwidth resource allocation instruction information and the bandwidth BR-Allocation requested to be allocated, the value of which is GBR increment-BR'.

In step 1314, the H(e)NB Policy Function sends to the BPCF an S9* session modification message, which carries resource allocation instruction information and the bandwidth BR-Allocation requested to be allocated, the value of which is GBR increment-BR'.

In step 1315, the BPCF accepts the request of the H(e)NB Policy Function, and includes an acceptance instruction in the response message returned to the H(e)NB Policy Function, and meanwhile the BPCF deducts GBR increment-BR' from the current available bandwidth of the broadband line.

In step 1316, the H(e)NB Policy Function returns to the HNB GW a response message, which carries the acceptance instruction.

In step 1317, the HNB GW further interacts with the HNB to establish a radio bearer.

In step 1318, the HNB GW returns a radio access bearer assignment response to the SGSN, carrying all acceptance instruction. If the triggering in step 1301 is from outside (for example the UE or the GGSN), then the SGSN further feeds it back to the triggering sending party, and the flow ends.

In other examples, in step 1303, in addition to the bandwidth information, the message sent by the HNB GW to the H(e)NB Policy Function also includes other QoS parameters issued by the core networks, for example QCI (or referred to as Traffic Class) and ARP, for requesting for QoS authorization; correspondingly, in step 1304, in addition to the bandwidth information, other QoS parameters issued by the core networks, for example QCI and ARP, are also carried for requesting the BPCF for QoS authorization; in step 1305, after the BPCF executes resource admission control (when resource admission control is implemented, in addition to considering whether the currently available remaining bandwidth can meet the requested bandwidth or not, the QCI and/or ARP will also be considered comprehensively so as to decide whether to accept or reject the QoS authorization request), the BPCF returns the QoS authorization information to the H(e)NB Policy Function, which carries an acceptance or rejection instruction, and also the acceptable bandwidth in the case of rejection instruction; in step 1306, the H(e)NB Policy Function returns the QoS authorization information to the HNB GW, which carries an acceptance or rejection instruction, and also the acceptable bandwidth in the case of rejection instruction; in step 1307, the HNB GW executes admission control according to the QoS authorization information (the executed logic judgment is identical with that in the above example).

In addition, as for 3G CS services, the MSC will also send to the HNB GW the radio access bearer assignment request message, which carries QoS parameters authorized by the core network, for example QCI, ARP, GBR, etc. Afterwards, the flow of the HNB GW requesting the fixed broadband access network for admission control through the H(e)NB Policy Function is similar to the above flow.

In the examples of the present invention, GBR bearer established or PDP context of GBR activated by other UEs accessing through the same broadband line should be construed as: GBR bearer established or PDP context of GBR activated by other UEs after accessing a 3GPP core network via a H(e)NB and establishing a PDN connection, wherein, the H(e)NB which other UEs access and the H(e)NB which the UE accesses may be the same or different; if they are different, the H(e)NB which other UEs access is connected to the 3GPP core network through the same broadband line as the H(e)NB which the UE accesses.

If only one H(e)NB accesses the 3GPP core network through one broadband line, then GBR bearer established or PDP context of GBR activated by other UEs accessing through the same broadband line can also be construed as GBR bearer established or PDP context of GBR activated by other subscribers accessing through the same H(e)NB.

The present invention further provides a H(e)NB gateway, which is configured to interact with a Broadband Policy Control Framework (BPCF) through a H(e)NB policy function and request for admission control of a fixed broadband access network;

the BPCF returns a result of the admission control to the H(e)NB gateway through the H(e)NB policy function.

Preferably, the H(e)NB gateway is configured to, after receiving a bearer operation request message carrying QoS information which is sent by a core network element, send the QoS information to the H(e)NB policy function;

the H(e)NB policy function sends the QoS information to the BPCF to request for the admission control of the fixed broadband access network.

Preferably, the H(e)NB gateway is further configured to:

accept the bearer operation request message when the received result of the admission control is acceptance; or reject the bearer operation request message when the received result of the admission control is rejection.

Preferably, the bearer operation request message comprises one of the following messages: bearer establishment request, bearer modification request, and radio access bearer assignment request.

Preferably, the H(e)NB gateway is further configured to send IPSec external tunnel information of a H(e)NB to a H(e)NB policy control function, the H(e)NB policy control function can determine the BPCF or the entry point of the fixed broadband access network where the BPCF is located according to the IPSec external tunnel information of the H(e)NB.

Preferably, the IPSec external tunnel information at least comprises a local IP address of a H(e)NB; if there is NAT between the H(e)NB and a security gateway, the IPSec external tunnel information further comprises a source port number.

Preferably, the H(e)NB gateway is further configured to: provide the IPSec external tunnel information of the H(e)NB for the BPCF through the H(e)NB policy control function after the H(e)NB is powered and registered to the H(e)NB gateway.

Preferably, the H(e)NB gateway is further configured to: interact with a H(e)NB to establish or modify a radio bearer after accepting the bearer operation request message.

Preferably, the H(e)NB gateway is further configured to: before rejecting the bearer operation request message when the received result of the admission control is rejection, perform admission control according to closed subscriber group (CSG) information of user equipment, or according to Allocation and Retention Priority (ARP) of a bearer or a PDP context, or according to CSG information and ARP of the bearer or PDP context.

Preferably, the H(e)NB gateway is further configured to: interact with the BPCF through the H(e)NB policy function to request for releasing resources of a bearer or a PDP context; receive an acceptance instruction sent by the fixed broadband access network after accepting the resource release request.

Preferably, the H(e)NB policy function is deployed separately or integrated in a policy and charging rules function.

Apparently, a person having ordinary skill in the art can appreciate that each module or each step of the present invention as above may be implemented by a general computing device, and they may be integrated in a single computing device or distributed in a network composed of a plurality of computing devices. Optionally, they can be implemented by using program codes executable for the computing device, so they can be stored in a storage device to be executed by the computing device; and in certain cases, the steps shown or described can be executed in an order different from that described herein, or they are formulated into each integrated circuit module respectively, or multiple modules or steps among them are formulated into a single integrated circuit to be implemented. In this way, the present invention is not limited to any particular combination of hardware and software.

The above examples are only preferred examples of the present invention, and are not used to limit the present invention. For a person having ordinary skill in the art, the present invention may have various modifications and changes. Any modification, equivalent substitution and improvement made within the spirit and principle of the present invention should be within the protection scope of the present invention.

INDUSTRIAL APPLICABILITY

The examples of the present invention provide a control method for H(e)NB access to implement policy control for service access of a UE accessing via a H(e)NB.

What is claimed is:

1. A control method for home evolved NodeB (H(e)NB) access, comprising:
   a H(e)NB gateway interacting with a Broadband Policy Control Framework (BPCF) through a H(e)NB policy function, and requesting for admission control of a fixed broadband access network;
   the BPCF returning a result of the admission control to the H(e)NB gateway through the H(e)NB policy function; and
   the H(e)NB gateway further interacting with a H(e)NB through the H(e)NB policy function to establish a radio bearer;
   wherein, the H(e)NB policy function acquiring H(e)NB location information comprises:
   a security gateway connected with the H(e)NB gateway sending an IPSec external tunnel information of a H(e)NB to the H(e)NB gateway, and then the H(e)NB gateway sending the IPSec external tunnel information of an H(e)NB to the H(e)NB policy function; wherein, the security gateway sending the IPSec external tunnel information to the H(e)NB gateway comprises:
   the security gateway sending the IPSec external tunnel information to the H(e)NB, and the H(e)NB sending the IPSec external tunnel information to the H(e)NB gateway; or
   the security gateway adding the IPSec external tunnel information into an S1 setup process initiated by the H(e)NB to be sent to the H(e)NB gateway; or
   the security gateway being connected to the H(e)NB, and the security gateway sending the IPSec external tunnel information to the H(e)NB gateway through a newly defined message; or
   the security gateway directly sending IPSec external tunnel information of the H(e)NB to the H(e)NB policy function; wherein, the security gateway directly sending IPSec external tunnel information of an H(e)NB to the H(e)NB policy function comprises:
   the security gateway sending a first message to the H(e)NB policy function, the first message carrying the IPSec external tunnel information and a remote IP address of the H(e)NB; the H(e)NB interacting with the H(e)NB gateway through an IPSec security association (SA) established between the H(e)NB and the security gateway, wherein the H(e)NB gateway obtains the remote IP address of the H(e)NB; the H(e)NB gateway sending a second message to the H(e)NB policy function, the second message carrying the remote IP address of the H(e)NB; and
   the H(e)NB policy function associating the first message with the second message according to the remote IP address of the H(e)NB, thereby obtaining the IPSec external tunnel information.

2. The method according to claim 1, wherein, the step of a H(e)NB gateway interacting with a BPCF through a H(e)NB policy function and requesting for admission control of a fixed broadband access network comprises:
   after receiving a bearer operation request message carrying QoS information which is sent by a core network element, the H(e)NB gateway sending the QoS information to the H(e)NB policy function;
   the H(e)NB policy function sending the QoS information to the BPCF to request for the admission control of the fixed broadband access network.

3. The method according to claim 1, further comprising:
   the H(e)NB gateway accepting a bearer operation request message when the result of the admission control received by the H(e)NB gateway is acceptance; or
   the H(e)NB gateway rejecting the bearer operation request message when the result of the admission control received by the H(e)NB gateway is rejection.

4. The method according to claim 2, wherein,
   the bearer operation request message comprises one of following messages: bearer establishment request, bearer modification request, and radio access bearer assignment request.

5. The method according to claim 1, further comprising:
   the H(e)NB policy function sending the IPSec external tunnel information of the H(e)NB to the BPCF, and the fixed broadband access network determining a location where the H(e)NB accesses.

6. The method according to claim 1, wherein,
   the IPSec external tunnel information at least comprises a local IP address of the H(e)NB;
   if there is a Network Address Translation (NAT) between the H(e)NB and the security gateway, the IPSec external tunnel information further comprises a source port number.

7. The method according to claim 1, further comprising:
   after the H(e)NB is powered on and registered to the H(e)NB gateway, the H(e)NB gateway or the SeGW providing the IPSec external tunnel information of the H(e)NB to the BPCF through the H(e)NB policy function.

8. The method according to claim 3, further comprising:
the H(e)NB gateway interacting with the H(e)NB to establish or modify a radio bearer after accepting the bearer operation request message.

9. The method according to claim 3, wherein,
before the H(e)NB gateway rejects the bearer operation request message when the result of the admission control received by the H(e)NB gateway is rejection, the method further comprises:
the H(e)NB gateway performing admission control according to closed subscriber group (CSG) information of user equipment, or according to Allocation and Retention Priority (ARP) of a bearer or a Packet Data Protocol (PDP) context, or according to the CSG information and the ARP of the bearer or PDP context.

10. The method according to claim 1, further comprising:
the H(e)NB gateway interacting with the BPCF through the H(e)NB policy function to request for releasing resources of a bearer or a PDP context;
the fixed broadband access network accepting the resource release request and sending an acceptance instruction to the H(e)NB gateway through the H(e)NB policy function.

11. The method according to claim 1, wherein,
the H(e)NB policy function is separately deployed or is integrated into a policy and charging rules function.

12. The method according to claim 2, wherein,
the core network element is one of following: Mobility Management Entity (MME), Serving General packet radio service support node (SGSN), and Mobile Switching Center (MSC).

13. A H(e)NB gateway, which is configured to: interact with a
Broadband Policy Control Framework (BPCF) through a H(e)NB policy function, and request for admission control of a fixed broadband access network; wherein, the BPCF returns a result of the admission control to the H(e)NB gateway through the H(e)NB policy function;
wherein the H(e)NB gateway is further configured to interact with a H(e)NB through the H(e)NB policy function to establish a radio bearer;
wherein, the H(e)NB policy function acquiring H(e)NB location information comprises:
a security gateway connected with the H(e)NB gateway sending an IPSec external tunnel information of a H(e)NB to the H(e)NB gateway, and then the H(e)NB gateway sending the IPSec external tunnel information of an H(e)NB to the H(e)NB policy function; wherein, the security gateway sending the IPSec external tunnel information to the H(e)NB gateway comprises:
the security gateway sending the IPSec external tunnel information to the H(e)NB, and the H(e)NB sending the IPSec external tunnel information to the H(e)NB gateway; or
the security gateway adding the IPSec external tunnel information into an S1 setup process initiated by the H(e)NB to be sent to the H(e)NB gateway; or
the security gateway being connected to the H(e)NB, and the security gateway sending the IPSec external tunnel information to the H(e)NB gateway through a newly defined message; or
the security gateway directly sending IPSec external tunnel information of the H(e)NB to the H(e)NB policy function; wherein, the security gateway directly sending IPSec external tunnel information of an H(e)NB to the H(e)NB policy function comprises:

the security gateway sending a first message to the H(e)NB policy function, the first message carrying the IPSec external tunnel information and a remote IP address of the H(e)NB;
the H(e)NB interacting with the H(e)NB gateway through an IPSec security association (SA) established between the H(e)NB and the security gateway, wherein the H(e)NB gateway obtains the remote IP address of the H(e)NB; the H(e)NB gateway sending a second message to the H(e)NB policy function, the second message carrying the remote IP address of the H(e)NB; and
the H(e)NB Policy function associating the first message with the second message according to the remote IP address of the H(e)NB, thereby obtaining the IPSec external tunnel information.

14. The H(e)NB gateway according to claim 13, wherein,
the H(e)NB gateway is configured to, after receiving a bearer operation request message carrying QoS information which is sent by a core network element, send the QoS information to the H(e)NB policy function;
wherein, the H(e)NB policy function sends the QoS information to the BPCF to request for the admission control of the fixed broadband access network.

15. The H(e)NB gateway according to claim 13, wherein, the H(e)NB gateway is further configured to:
accept a bearer operation request message when the received result of the admission control is acceptance; or
reject the bearer operation request message when the received result of the admission control is rejection;
or
the H(e)NB gateway is further configured to: interact with the BPCF through the H(e)NB policy function to request for releasing resources of a bearer or a PDP context; and receive an acceptance instruction sent by the fixed broadband access network after the fixed broadband access network accepts the resource release request.

16. The H(e)NB gateway according to claim 14, wherein, the bearer operation request message comprises one of following messages: bearer establishment request, bearer modification request, and radio access bearer assignment request.

17. The H(e)NB gateway according to claim 13, wherein, the IPSec external tunnel information at least comprises a local IP address of the H(e)NB; if there is a Network Address Translation (NAT) between the H(e)NB and the security gateway, the IPSec external tunnel information further comprises a source port number;
or
the H(e)NB gateway is further configured to:
provide the IPSec external tunnel information of the H(e)NB to the BPCF through the H(e)NB policy function after the H(e)NB is powered on and registered to the H(e)NB gateway.

18. The H(e)NB gateway according to claim 16, wherein, the H(e)NB gateway is further configured to: interact with the H(e)NB to establish or modify a radio bearer after receiving the bearer operation request message;
or
the H(e)NB gateway is further configured to: before rejecting the bearer operation request message when the received result of the admission control is rejection,
perform admission control according to closed subscriber group (CSG) information of user equipment, or according to Allocation and Retention Priority (ARP) of a bearer or a PDP context, or according to the CSG information and the ARP of the bearer or PDP context.

* * * * *